US012073448B1

(12) United States Patent
Cain et al.

(10) Patent No.: US 12,073,448 B1
(45) Date of Patent: *Aug. 27, 2024

(54) SYSTEM, METHOD, APPARATUS AND MEDIUM FOR SIMULTANEOUSLY GENERATING VEHICLE HISTORY REPORTS AND PREAPPROVED FINANCING OPTIONS

(71) Applicant: Experian Information Solutions, Inc., Costa Mesa, CA (US)

(72) Inventors: Ryan B. Cain, Elgin, IL (US); Will Hope, Sugar Grove, IL (US); Kirsten Von Busch, Palantine, IL (US); Dominic Edward DeGuiseppe, Naperville, IL (US)

(73) Assignee: Experian Information Solutions, Inc., Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/948,081

(22) Filed: Sep. 19, 2022

Related U.S. Application Data

(63) Continuation of application No. 16/792,107, filed on Feb. 14, 2020, now Pat. No. 11,481,827, which is a
(Continued)

(51) Int. Cl.
*G06Q 30/06* (2023.01)
*G06Q 30/0601* (2023.01)
(Continued)

(52) U.S. Cl.
CPC ..... *G06Q 30/0623* (2013.01); *G06Q 30/0641* (2013.01); *G06Q 40/03* (2023.01); *G07C 5/08* (2013.01)

(58) Field of Classification Search
CPC . G06Q 30/0623; G06Q 30/0641; G06Q 40/03
(Continued)

(56) References Cited

U.S. PATENT DOCUMENTS

| 4,989,144 A | 1/1991 | Barnett, III |
| 5,120,704 A | 6/1992 | Lechter et al. |

(Continued)

FOREIGN PATENT DOCUMENTS

| EP | 0 749 081 | 12/1996 |
| EP | 1 122 664 | 8/2001 |

(Continued)

OTHER PUBLICATIONS

U.S. Appl. No. 14/975,470, U.S. Pat. No. 10,580,054, System, Method, Apparatus and Medium for Simultaneously Generating Vehicle History Reports and Preapproved Financing Options, filed Dec. 18, 2015.

(Continued)

*Primary Examiner* — Yogesh C Garg
(74) *Attorney, Agent, or Firm* — Knobbe, Martens, Olson & Bear, LLP

(57) ABSTRACT

One embodiment of the system and method described herein provides a computer system configured to provide an interface for operation by a user at a remote computing device, receive a request from the user for a vehicle history report of a vehicle. The computer system is further configured to prompt the user for interest in a prequalification for a financing offer. The computer system is further configured to receive the indication of the user's interest in the prequalification. The system also includes a data storage module, accessible by the computer system, configured to retrieve data corresponding to the vehicle, store the retrieved data, retrieve data corresponding to a determination regarding the prequalification for the financing offer, and store the
(Continued)

retrieved determination. The computer system is further configured to convey the vehicle history report to the user and convey the prequalification determination to the user.

20 Claims, 7 Drawing Sheets

Related U.S. Application Data continuation of application No. 14/975,470, filed on Dec. 18, 2015, now Pat. No. 10,580,054.

(60) Provisional application No. 62/093,973, filed on Dec. 18, 2014.

(51) Int. Cl.
*G06Q 40/03* (2023.01)
*G07C 5/08* (2006.01)

(58) Field of Classification Search
USPC .................................. 705/26.61, 26.1, 27.1
See application file for complete search history.

(56) References Cited

U.S. PATENT DOCUMENTS

| | | |
|---|---|---|
| 5,201,010 A | 4/1993 | Deaton et al. |
| 5,216,612 A | 6/1993 | Cornett et al. |
| 5,488,360 A | 1/1996 | Ray |
| 5,532,838 A | 7/1996 | Barbari |
| 5,587,575 A | 12/1996 | Leitner et al. |
| 5,630,070 A | 5/1997 | Dietrich et al. |
| 5,748,098 A | 5/1998 | Grace |
| 5,765,143 A | 6/1998 | Sheldon et al. |
| 5,819,234 A | 10/1998 | Slavin et al. |
| 5,878,403 A | 3/1999 | DeFrancesco |
| 5,940,812 A | 8/1999 | Tengel et al. |
| 5,950,169 A | 9/1999 | Borghesi et al. |
| 5,963,129 A | 10/1999 | Warner |
| 5,995,947 A | 11/1999 | Fraser et al. |
| 6,006,201 A | 12/1999 | Berent et al. |
| 6,038,554 A | 3/2000 | Vig |
| 6,052,065 A | 4/2000 | Glover |
| 6,052,068 A | 4/2000 | Price et al. |
| 6,076,064 A | 6/2000 | Rose, Jr. |
| 6,126,332 A | 10/2000 | Cubbage et al. |
| 6,154,152 A | 11/2000 | Ito |
| 6,182,048 B1 | 1/2001 | Osborn et al. |
| 6,208,979 B1 | 3/2001 | Sinclair |
| 6,236,977 B1 | 5/2001 | Verba et al. |
| 6,259,354 B1 | 7/2001 | Underwood |
| 6,278,936 B1 | 8/2001 | Jones |
| 6,282,517 B1 | 8/2001 | Wolfe et al. |
| 6,330,499 B1 | 12/2001 | Chou et al. |
| 6,330,546 B1 | 12/2001 | Gopinathan et al. |
| 6,430,539 B1 | 8/2002 | Lazarus et al. |
| 6,516,239 B1 | 2/2003 | Madden et al. |
| 6,587,841 B1 | 7/2003 | DeFrancesco |
| 6,609,108 B1 | 8/2003 | Pulliam et al. |
| 6,714,859 B2 | 3/2004 | Jones |
| 6,738,748 B2 | 5/2004 | Wetzer |
| 6,754,564 B2 | 6/2004 | Newport |
| 6,760,794 B2 | 7/2004 | Deno et al. |
| 6,772,145 B2 | 8/2004 | Shishido |
| 6,804,606 B2 | 10/2004 | Jones |
| 6,839,682 B1 | 1/2005 | Blume et al. |
| 6,904,359 B2 | 6/2005 | Jones |
| 6,938,021 B2 | 8/2005 | Shear et al. |
| 6,959,281 B1 | 10/2005 | Freeling et al. |
| 6,980,963 B1 | 12/2005 | Hanzek |
| 7,024,418 B1 | 4/2006 | Childress |
| 7,050,982 B2 | 5/2006 | Sheinson et al. |
| 7,069,118 B2 | 6/2006 | Coletrane et al. |
| 7,092,898 B1 | 8/2006 | Mattick et al. |
| 7,113,853 B2 | 9/2006 | Hecklinger |
| 7,130,821 B1 | 10/2006 | Connors et al. |
| 7,181,427 B1 | 2/2007 | DeFrancesco |
| 7,184,974 B2 | 2/2007 | Shishido |
| 7,191,058 B2 | 3/2007 | Laird et al. |
| 7,228,298 B1 | 6/2007 | Raines |
| 7,288,298 B2 | 6/2007 | Raines |
| 7,275,083 B1 | 9/2007 | Seibel et al. |
| 7,366,694 B2 | 4/2008 | Lazerson |
| 7,392,203 B2 | 6/2008 | Edison et al. |
| 7,392,221 B2 | 6/2008 | Nabe et al. |
| 7,418,408 B1 | 8/2008 | Heppe |
| 7,421,322 B1 | 9/2008 | Silversmith et al. |
| 7,433,891 B2 | 10/2008 | Haber et al. |
| 7,444,302 B2 | 10/2008 | Hu et al. |
| 7,472,088 B2 | 12/2008 | Taylor et al. |
| RE40,692 E | 3/2009 | Rose, Jr. |
| 7,505,838 B2 | 3/2009 | Raines et al. |
| 7,561,963 B2 | 7/2009 | Brice et al. |
| 7,567,922 B1 | 7/2009 | Weinberg et al. |
| 7,571,139 B1 | 8/2009 | Giordano et al. |
| 7,580,856 B1 | 8/2009 | Pliha |
| 7,590,589 B2 | 9/2009 | Hoffberg |
| 7,593,893 B1 | 9/2009 | Ladd et al. |
| 7,596,512 B1 | 9/2009 | Raines et al. |
| 7,603,293 B2 | 10/2009 | Chenn |
| 7,610,257 B1 | 10/2009 | Abrahams |
| 7,630,932 B2 | 12/2009 | Danaher et al. |
| 7,653,592 B1 | 1/2010 | Flaxman et al. |
| 7,693,896 B1 | 4/2010 | Raines |
| 7,739,142 B2 | 6/2010 | Chand et al. |
| 7,778,841 B1 | 8/2010 | Bayer et al. |
| 7,788,147 B2 | 8/2010 | Haggerty et al. |
| 7,835,940 B2 | 11/2010 | Kowalchuk |
| 7,865,409 B1 | 1/2011 | Monaghan |
| 7,877,320 B1 | 1/2011 | Downey |
| 7,925,654 B1 | 4/2011 | Raines |
| 7,945,478 B2 | 5/2011 | Hogan et al. |
| 7,945,483 B2 | 5/2011 | Inghelbrecht et al. |
| 7,962,404 B1 | 6/2011 | Metzger, II et al. |
| 7,966,210 B2 | 6/2011 | Hall et al. |
| 7,974,886 B2 | 7/2011 | Coleman |
| 7,991,689 B1 | 8/2011 | Brunzell et al. |
| 8,005,759 B2 | 8/2011 | Hirtenstein et al. |
| 8,005,795 B2 | 8/2011 | Galipeau et al. |
| 8,036,952 B2 | 10/2011 | Mohr et al. |
| 8,055,544 B2 | 11/2011 | Ullman et al. |
| 8,078,524 B2 | 12/2011 | Crawford et al. |
| 8,104,671 B2 | 1/2012 | Besecker et al. |
| 8,121,938 B1 | 2/2012 | Zettner et al. |
| 8,185,417 B1 | 5/2012 | Brown et al. |
| 8,219,464 B2 | 7/2012 | Inghelbrecht et al. |
| 8,239,388 B2 | 8/2012 | Raines |
| 8,244,563 B2 | 8/2012 | Coon et al. |
| 8,255,243 B2 | 8/2012 | Raines et al. |
| 8,255,244 B2 | 8/2012 | Raines et al. |
| 8,285,656 B1 | 10/2012 | Chang et al. |
| 8,355,983 B1 | 1/2013 | Parr et al. |
| 8,380,594 B2 | 2/2013 | Berkman et al. |
| 8,392,334 B2 | 3/2013 | Hirtenstein et al. |
| 8,438,048 B1 | 5/2013 | Benavides, III |
| 8,438,170 B2 | 5/2013 | Koran et al. |
| 8,521,615 B2 | 8/2013 | Inghelbrecht et al. |
| 8,560,161 B1 * | 10/2013 | Kator .................... G07C 5/008 701/29.6 |
| 8,577,736 B2 | 11/2013 | Swinson et al. |
| 8,595,079 B1 | 11/2013 | Raines et al. |
| 8,600,783 B2 | 12/2013 | Smith et al. |
| 8,600,823 B1 | 12/2013 | Raines et al. |
| 8,606,648 B1 | 12/2013 | Bayer et al. |
| 8,626,560 B1 | 1/2014 | Anderson |
| 8,630,929 B2 | 1/2014 | Haggerty et al. |
| 8,645,193 B2 | 2/2014 | Swinson et al. |
| 8,661,032 B2 | 2/2014 | Otten et al. |
| 8,725,584 B1 | 5/2014 | Eager et al. |
| 8,762,191 B2 | 6/2014 | Lawrence et al. |
| 8,781,846 B2 | 7/2014 | Swinson et al. |
| 9,020,843 B2 | 4/2015 | Taira et al. |
| 9,020,844 B2 | 4/2015 | Taira et al. |

(56) References Cited

U.S. PATENT DOCUMENTS

| | | |
|---|---|---|
| 9,053,589 B1 | 6/2015 | Kator et al. |
| 9,053,590 B1 | 6/2015 | Kator et al. |
| 9,076,276 B1 | 7/2015 | Kator et al. |
| 9,087,335 B2 | 7/2015 | Rane et al. |
| 9,105,048 B2 | 8/2015 | Koran et al. |
| 9,111,308 B2 | 8/2015 | Taira et al. |
| 9,123,056 B2 | 9/2015 | Singh et al. |
| 9,129,325 B2 | 9/2015 | Taira et al. |
| 9,147,217 B1 | 9/2015 | Zabritski et al. |
| 9,292,860 B2 | 3/2016 | Singh et al. |
| 9,501,781 B2 | 11/2016 | Singh et al. |
| 9,646,308 B1 | 5/2017 | Eager et al. |
| 9,690,820 B1 | 6/2017 | Girulat, Jr. |
| 9,697,544 B1 | 7/2017 | Bayer et al. |
| 9,727,904 B2 | 8/2017 | Inghelbrecht et al. |
| 9,741,066 B2 | 8/2017 | Eager et al. |
| 9,754,304 B2 | 9/2017 | Taira et al. |
| 9,818,140 B2 | 11/2017 | Inghelbrecht et al. |
| 9,904,933 B2 | 2/2018 | Taira et al. |
| 9,904,948 B2 | 2/2018 | Taira et al. |
| 10,009,432 B1 | 6/2018 | Tang et al. |
| 10,162,848 B2 | 12/2018 | Mohan et al. |
| 10,163,156 B1 * | 12/2018 | Shapley .................. G06Q 40/03 |
| 10,217,123 B2 | 2/2019 | Taira et al. |
| 10,269,030 B2 | 4/2019 | Taira et al. |
| 10,269,031 B2 | 4/2019 | Inghelbrecht et al. |
| 10,380,654 B2 | 8/2019 | Hirtenstein et al. |
| 10,409,867 B1 | 9/2019 | Von Busch et al. |
| 10,430,848 B2 | 10/2019 | Cotton et al. |
| 10,489,809 B2 | 11/2019 | Inghelbrecht et al. |
| 10,489,810 B2 | 11/2019 | Taira et al. |
| 10,515,382 B2 | 12/2019 | Taira et al. |
| 10,565,181 B1 | 2/2020 | Hjermstad et al. |
| 10,580,054 B2 | 3/2020 | Cain et al. |
| 10,581,825 B2 | 3/2020 | Poschel et al. |
| 10,740,404 B1 | 8/2020 | Hjermstad et al. |
| 10,853,831 B2 | 12/2020 | Inghelbrecht et al. |
| 10,977,727 B1 | 4/2021 | Smith et al. |
| 11,017,427 B1 | 5/2021 | Badger et al. |
| 11,157,835 B1 | 10/2021 | Hjermstad et al. |
| 11,176,608 B1 | 11/2021 | Smith |
| 11,210,276 B1 | 12/2021 | Smith |
| 11,210,351 B1 | 12/2021 | Von Busch et al. |
| 11,257,126 B2 | 2/2022 | Hirtenstein et al. |
| 11,301,922 B2 | 4/2022 | Smith |
| 11,366,860 B1 | 6/2022 | Hjermstad et al. |
| 11,481,827 B1 | 10/2022 | Cain et al. |
| 11,532,030 B1 | 12/2022 | Smith |
| 11,568,005 B1 | 1/2023 | Von Busch et al. |
| 11,587,163 B1 | 2/2023 | Smith |
| 11,640,433 B1 | 5/2023 | Hjermstad et al. |
| 11,790,269 B1 | 10/2023 | Hjermstad et al. |
| 11,836,785 B1 | 12/2023 | Smith |
| 11,886,519 B1 | 1/2024 | Von Busch et al. |
| 2001/0044769 A1 | 11/2001 | Chaves |
| 2002/0023051 A1 | 2/2002 | Kunzle et al. |
| 2002/0042752 A1 | 4/2002 | Chaves |
| 2002/0072964 A1 | 6/2002 | Choi |
| 2002/0082978 A1 | 6/2002 | Ghouri et al. |
| 2002/0091706 A1 | 7/2002 | Anderson et al. |
| 2002/0099628 A1 | 7/2002 | Takaoka et al. |
| 2002/0103622 A1 | 8/2002 | Burge |
| 2002/0128960 A1 | 9/2002 | Lambiotte et al. |
| 2002/0161496 A1 | 10/2002 | Yamaki |
| 2002/0193925 A1 | 12/2002 | Funkhouser et al. |
| 2003/0033242 A1 | 2/2003 | Lynch et al. |
| 2003/0041019 A1 | 2/2003 | Vagim, III et al. |
| 2003/0046179 A1 | 3/2003 | Anabtawi et al. |
| 2003/0101111 A1 | 5/2003 | Dang et al. |
| 2003/0105728 A1 | 6/2003 | Yano et al. |
| 2003/0144950 A1 | 7/2003 | O'Brien et al. |
| 2003/0177481 A1 | 9/2003 | Amaru et al. |
| 2003/0187753 A1 | 10/2003 | Takaoka |
| 2003/0200151 A1 | 10/2003 | Ellenson et al. |
| 2003/0216965 A1 | 11/2003 | Libman |
| 2003/0233323 A1 | 12/2003 | Bilski et al. |
| 2004/0034657 A1 | 2/2004 | Zambo et al. |
| 2004/0039646 A1 | 2/2004 | Hacker |
| 2004/0088228 A1 | 5/2004 | Mercer et al. |
| 2004/0093286 A1 | 5/2004 | Cooper et al. |
| 2004/0107125 A1 | 6/2004 | Guheen et al. |
| 2004/0128262 A1 | 7/2004 | Nafousi |
| 2004/0163101 A1 | 8/2004 | Swix |
| 2004/0193644 A1 | 9/2004 | Baker et al. |
| 2004/0243506 A1 | 12/2004 | Das |
| 2004/0249532 A1 | 12/2004 | Kelly et al. |
| 2005/0010555 A1 | 1/2005 | Gallivan |
| 2005/0021384 A1 | 1/2005 | Pantaleo et al. |
| 2005/0038580 A1 | 2/2005 | Seim et al. |
| 2005/0113991 A1 | 5/2005 | Rogers et al. |
| 2005/0173524 A1 | 8/2005 | Schrader |
| 2005/0177489 A1 | 8/2005 | Neff et al. |
| 2005/0209892 A1 | 9/2005 | Miller |
| 2005/0234912 A1 | 10/2005 | Roach |
| 2005/0246256 A1 | 11/2005 | Gastineau et al. |
| 2005/0251820 A1 | 11/2005 | Stefanik et al. |
| 2005/0256780 A1 | 11/2005 | Eldred |
| 2005/0267754 A1 | 12/2005 | Schultz et al. |
| 2005/0267774 A1 | 12/2005 | Merritt et al. |
| 2006/0004731 A1 | 1/2006 | Seibel et al. |
| 2006/0010052 A1 | 1/2006 | Willingham |
| 2006/0015425 A1 | 1/2006 | Brooks |
| 2006/0031182 A1 | 2/2006 | Ryan et al. |
| 2006/0041443 A1 | 2/2006 | Horvath |
| 2006/0107560 A1 | 5/2006 | Wong |
| 2006/0149674 A1 | 7/2006 | Cook et al. |
| 2006/0163868 A1 | 7/2006 | Baumann |
| 2006/0178957 A1 | 8/2006 | LeClaire |
| 2006/0178973 A1 | 8/2006 | Chiovari et al. |
| 2006/0202012 A1 | 9/2006 | Grano et al. |
| 2006/0202862 A1 | 9/2006 | Ratnakar |
| 2006/0206416 A1 | 9/2006 | Farias |
| 2006/0218079 A1 | 9/2006 | Goldblatt et al. |
| 2006/0229799 A1 | 10/2006 | Nimmo et al. |
| 2006/0242046 A1 | 10/2006 | Haggerty et al. |
| 2006/0242050 A1 | 10/2006 | Haggerty et al. |
| 2006/0277141 A1 | 12/2006 | Palmer |
| 2007/0011083 A1 | 1/2007 | Bird et al. |
| 2007/0027791 A1 | 2/2007 | Young et al. |
| 2007/0043487 A1 | 2/2007 | Krzystofczyk et al. |
| 2007/0059442 A1 | 3/2007 | Sabeta |
| 2007/0136163 A1 | 6/2007 | Bell |
| 2007/0156515 A1 | 7/2007 | Hasselback et al. |
| 2007/0162293 A1 | 7/2007 | Malkon |
| 2007/0173993 A1 | 7/2007 | Nielsen et al. |
| 2007/0179798 A1 | 8/2007 | Inbarajan |
| 2007/0179860 A1 | 8/2007 | Romero |
| 2007/0185777 A1 | 8/2007 | Pyle et al. |
| 2007/0192165 A1 | 8/2007 | Haggerty et al. |
| 2007/0226131 A1 | 9/2007 | Decker et al. |
| 2007/0244732 A1 | 10/2007 | Chatterji et al. |
| 2007/0250327 A1 | 10/2007 | Hedy |
| 2007/0271178 A1 | 11/2007 | Davis et al. |
| 2007/0282713 A1 | 12/2007 | Ullman et al. |
| 2007/0288271 A1 | 12/2007 | Klinkhammer |
| 2007/0294163 A1 | 12/2007 | Harmon et al. |
| 2008/0015954 A1 | 1/2008 | Huber et al. |
| 2008/0016119 A1 | 1/2008 | Sharma et al. |
| 2008/0059317 A1 | 3/2008 | Chandran et al. |
| 2008/0071882 A1 | 3/2008 | Hering et al. |
| 2008/0097663 A1 | 4/2008 | Morimoto |
| 2008/0120155 A1 | 5/2008 | Pliha |
| 2008/0126137 A1 | 5/2008 | Kidd et al. |
| 2008/0177590 A1 | 7/2008 | Brodsky et al. |
| 2008/0183689 A1 | 7/2008 | Kubota et al. |
| 2008/0183722 A1 | 7/2008 | Lane et al. |
| 2008/0201163 A1 | 8/2008 | Barker et al. |
| 2008/0228635 A1 | 9/2008 | Megdal et al. |
| 2008/0235061 A1 | 9/2008 | Innes |
| 2008/0255897 A1 | 10/2008 | Megdal et al. |
| 2008/0294540 A1 | 11/2008 | Celka et al. |
| 2008/0294546 A1 | 11/2008 | Flannery |
| 2008/0301188 A1 | 12/2008 | O'Hara |
| 2008/0312969 A1 | 12/2008 | Raines et al. |

(56) References Cited

U.S. PATENT DOCUMENTS

| | | |
|---|---|---|
| 2009/0018996 A1 | 1/2009 | Hunt et al. |
| 2009/0055044 A1 | 2/2009 | Dienst |
| 2009/0063172 A1 | 3/2009 | Thomas et al. |
| 2009/0083130 A1 | 3/2009 | Hall et al. |
| 2009/0138290 A1 | 5/2009 | Holden |
| 2009/0144201 A1 | 6/2009 | Gierkink et al. |
| 2009/0187513 A1 | 7/2009 | Noy et al. |
| 2009/0240602 A1 | 9/2009 | Mohr et al. |
| 2009/0240735 A1 | 9/2009 | Grandhi et al. |
| 2009/0254856 A1* | 10/2009 | Cwajbaum ............ G06F 16/957 715/808 |
| 2009/0271296 A1 | 10/2009 | Romero |
| 2009/0271385 A1 | 10/2009 | Krishnamoorthy et al. |
| 2009/0287370 A1 | 11/2009 | Iwai et al. |
| 2010/0030649 A1 | 2/2010 | Ubelhor |
| 2010/0049538 A1 | 2/2010 | Frazer et al. |
| 2010/0070343 A1 | 3/2010 | Taira et al. |
| 2010/0070382 A1 | 3/2010 | Inghelbrecht et al. |
| 2010/0076881 A1 | 3/2010 | O'Grady et al. |
| 2010/0082792 A1 | 4/2010 | Johnson |
| 2010/0088158 A1 | 4/2010 | Pollack |
| 2010/0094664 A1 | 4/2010 | Bush et al. |
| 2010/0153235 A1 | 6/2010 | Mohr et al. |
| 2010/0161486 A1 | 6/2010 | Liu et al. |
| 2010/0174657 A1 | 7/2010 | Stanton, Jr. |
| 2010/0179861 A1 | 7/2010 | Teerilahti et al. |
| 2010/0198629 A1 | 8/2010 | Wesileder et al. |
| 2010/0217616 A1 | 8/2010 | Colson et al. |
| 2010/0223106 A1 | 9/2010 | Hallowell et al. |
| 2010/0293089 A1 | 11/2010 | Peterson et al. |
| 2010/0293181 A1 | 11/2010 | Muller et al. |
| 2010/0299190 A1 | 11/2010 | Pratt et al. |
| 2010/0332292 A1 | 12/2010 | Anderson |
| 2011/0022489 A1 | 1/2011 | Hallowell et al. |
| 2011/0022525 A1 | 1/2011 | Swinson et al. |
| 2011/0040440 A1 | 2/2011 | de Oliveira et al. |
| 2011/0082759 A1 | 4/2011 | Swinson et al. |
| 2011/0137758 A1 | 6/2011 | Bienias |
| 2011/0161115 A1 | 6/2011 | Hampton |
| 2011/0202471 A1 | 8/2011 | Scott et al. |
| 2011/0213641 A1 | 9/2011 | Metzger, II et al. |
| 2011/0264595 A1 | 10/2011 | Anspach et al. |
| 2011/0270706 A1 | 11/2011 | Anspach et al. |
| 2011/0270707 A1 | 11/2011 | Breed et al. |
| 2011/0276467 A1 | 11/2011 | Blackburn et al. |
| 2011/0320241 A1 | 12/2011 | Miller |
| 2012/0005045 A1 | 1/2012 | Baker |
| 2012/0005070 A1 | 1/2012 | McFall et al. |
| 2012/0005108 A1 | 1/2012 | Hollenshead et al. |
| 2012/0106801 A1 | 5/2012 | Jackson |
| 2012/0109770 A1 | 5/2012 | Seergy et al. |
| 2012/0197699 A1 | 8/2012 | Snell et al. |
| 2012/0221485 A1 | 8/2012 | Leidner et al. |
| 2012/0239637 A9 | 9/2012 | Prakash et al. |
| 2012/0254017 A1 | 10/2012 | Fusco et al. |
| 2012/0265648 A1 | 10/2012 | Jerome et al. |
| 2012/0271850 A1 | 10/2012 | Licata Messana et al. |
| 2012/0331010 A1 | 12/2012 | Christie |
| 2013/0006801 A1 | 1/2013 | Solari et al. |
| 2013/0006809 A1 | 1/2013 | Hollenshead et al. |
| 2013/0159033 A1 | 6/2013 | Weinstock et al. |
| 2013/0173453 A1 | 7/2013 | Raines et al. |
| 2013/0173481 A1 | 7/2013 | Hirtenstein et al. |
| 2013/0238455 A1 | 9/2013 | Laracey |
| 2013/0268298 A1 | 10/2013 | Elkins et al. |
| 2014/0025681 A1 | 1/2014 | Raines |
| 2014/0058956 A1 | 2/2014 | Raines et al. |
| 2014/0082017 A1 | 3/2014 | Miller |
| 2014/0258309 A1 | 9/2014 | Young |
| 2014/0278402 A1* | 9/2014 | Charugundla ......... H04M 7/0024 704/235 |
| 2014/0279868 A1 | 9/2014 | Astorg et al. |
| 2014/0358719 A1 | 12/2014 | Inghelbrect et al. |
| 2015/0154608 A9 | 6/2015 | Raines |
| 2015/0213559 A1 | 7/2015 | Raines et al. |
| 2015/0227942 A1 | 8/2015 | Sidman et al. |
| 2015/0310865 A1 | 10/2015 | Fay et al. |
| 2015/0317728 A1 | 11/2015 | Nguyen |
| 2015/0324400 A1 | 11/2015 | Sheck et al. |
| 2015/0332411 A1 | 11/2015 | Bush et al. |
| 2015/0348143 A1 | 12/2015 | Raines et al. |
| 2015/0348145 A1 | 12/2015 | Nakajima |
| 2016/0004742 A1 | 1/2016 | Mohan et al. |
| 2016/0012494 A1 | 1/2016 | Lasini |
| 2016/0048698 A1 | 2/2016 | Sahu et al. |
| 2016/0104222 A1* | 4/2016 | Savir ................. G06Q 30/0611 705/26.4 |
| 2016/0217046 A1 | 7/2016 | Lamoureux et al. |
| 2016/0267588 A1 | 9/2016 | Cain et al. |
| 2016/0299905 A1 | 10/2016 | Geyer et al. |
| 2016/0321726 A1 | 11/2016 | Singh et al. |
| 2016/0379486 A1 | 12/2016 | Taylor |
| 2017/0052652 A1 | 2/2017 | Denton et al. |
| 2017/0270490 A1 | 9/2017 | Penilla et al. |
| 2017/0323295 A1 | 11/2017 | Kranzley et al. |
| 2018/0018723 A1 | 1/2018 | Nagla et al. |
| 2018/0107676 A1 | 4/2018 | Vora |
| 2018/0108189 A1 | 4/2018 | Park et al. |
| 2018/0157761 A1 | 6/2018 | Halstead et al. |
| 2018/0165747 A1 | 6/2018 | Patten et al. |
| 2018/0260838 A1 | 9/2018 | New et al. |
| 2018/0349988 A1 | 12/2018 | Shebesta et al. |
| 2019/0295133 A1 | 9/2019 | Hirtenstein et al. |
| 2020/0051102 A1 | 2/2020 | Taira et al. |
| 2020/0065885 A1 | 2/2020 | Smith |
| 2020/0065898 A1* | 2/2020 | Forrester ................ G06Q 40/03 |
| 2020/0265480 A1 | 8/2020 | Swinson et al. |
| 2022/0198527 A1 | 6/2022 | Hirtenstein et al. |

FOREIGN PATENT DOCUMENTS

| | | | |
|---|---|---|---|
| JP | 09-251486 | 9/1997 | |
| JP | 10-222559 | 8/1998 | |
| JP | 10-261009 | 9/1998 | |
| JP | 2000-331068 | 11/2000 | |
| JP | 2001-297141 | 10/2001 | |
| JP | 2001-344463 | 12/2001 | |
| JP | 2001-357256 | 12/2001 | |
| JP | 2002-149778 | 5/2002 | |
| JP | 2002-163498 | 6/2002 | |
| JP | 2002-259753 | 9/2002 | |
| JP | 2003-271851 | 9/2003 | |
| JP | 2003-316881 | 11/2003 | |
| JP | 2004245897 A * | 9/2004 | ............ G10K 15/04 |
| JP | 2007-299281 | 11/2007 | |
| KR | 10-2000-0036594 | 7/2000 | |
| KR | 10-2000-0063995 | 11/2000 | |
| KR | 10-2001-0016349 | 3/2001 | |
| KR | 10-2001-0035145 | 5/2001 | |
| KR | 10-2002-0007132 | 1/2002 | |
| KR | 10-2002-0068866 | 8/2002 | |
| KR | 20140020388 A * | 2/2014 | ............ G06Q 30/06 |
| NZ | 503219 | 8/2003 | |
| WO | WO 99/004350 | 1/1999 | |
| WO | WO 99/022328 | 5/1999 | |
| WO | WO 01/071458 | 9/2001 | |
| WO | WO 01/075754 | 10/2001 | |
| WO | WO 03/101123 | 12/2003 | |
| WO | WO 2007/149941 | 12/2007 | |
| WO | WO 2008/022289 | 2/2008 | |
| WO | WO 2018/199992 | 11/2018 | |

OTHER PUBLICATIONS

U.S. Appl. No. 16/792,107, U.S. Pat. No. 11,481,827, System, Method, Apparatus and Medium for Simultaneously Generating Vehicle History Reports and Preapproved Financing Options, filed Feb. 14, 2020.

"Activant PartExpert with Vehicle Identification Number (VIN) Lookup", Activant Solutions, Inc., Livermore, CA, Copyright 2006, http://counterworks.com/PartExp_DS_092806.pdf, pp. 2.

"AutoConnect Partners with Organic to Build World's Most Com-

(56) References Cited

OTHER PUBLICATIONS prehensive Online Emporium of Pre-Owned Vehicles", PR Newswire, May 19, 1998, pp. 2.
"Auto Market StatisticsSM:Drive Response with Aggregated Motor Vehicle Information", Experian, Apr. 2007, http://www.experian.com/assets/marketing-services/product-sheets/auto-market-statistics.pdf, pp. 2.
"Appraisal Tool", VAuto Live Market View, Dec. 14, 2007, http://www.vauto.com/vAuto_solution/appraisal.asp, pp. 3.
Autobytel.com, http://web.archive.org/web/20040806010507//http://autobytel.com/, as archived Aug. 6, 2004, pp. 3.
Bala, Pradip Kumar, "Purchase-Driven Classification for Improved Forecasting in Spare Parts Inventory Replenishment," International Journal of Computer Applications, Nov. 2010, vol. 10, No. 9, pp. 40-45.
Bankrate.com, http://web.archive.org/web/20040809000026/www.bankrate.com/brm/default.asp, as archived Aug. 9, 2004, pp. 3.
"Carfax Teams with Esurance", PR Newswire, May 14, 2001, p. 1.
Cars.com, http://web.archive.org/web/20041010081241/www.cars.com/go/index.jsp?aff=national, as archived Oct. 10, 2004, pp. 2.
Carsdirect.com, http://web.archive.org/web/20040730142836/www.carsdirect.com/home, as archived Jul. 30, 2004, pp. 2.
Checkbook.org, http://web.archive.org/web/20040604192834/www.checkbook.org/auto/carbarg.cfm, as archived Jun. 4, 2004, p. 1.
"Consumer Reports Finds American-Made Vehicles Close Reliability Gap with European-Made Vehicle—As Japanese Continue to Set New Benchmarks for the Industry", Consumer Reports: Consumers Union, Yonkers, NY, Apr. 2003, pp. 2.
Cohen et al., "Optimizer: IBM's Multi Echelon Inventory System for Managing Service Logistics", Interfaces, vol. 20, No. 1, Jan.-Feb. 1990, pp. 65-82.
Copeland et al., "Wallet-on-Wheels—Using Vehicle's Identity for Secure Mobile Money", 17th International Conference on Intelligence in Next Generation Networks, 2013, pp. 102-109.
"Driveitaway.com Links with AutoCheck to Provide Car Shoppers Vehicle Histories; Consumers Bidding on Driveitaway.com's Used Auto Auctions Can Now Go Online to Research a Specific Vehicle's History", PR Newswire, Jan. 15, 2001, p. 1.
"Experian Uses SSA-NAME3 to Match 40 to 50 Million Transactions per Month Against an 11.5 Billion Row Database", DM Review, Apr. 2001, vol. 11, No. 4, pp. 3.
Farrell et al., "Installed Base and Compatibility: Innovation, Product Preannouncements, and Predation", The American Economic Review, Dec. 1986, vol. 76, No. 5, pp. 940-955.
Garcia-Molina et al., "Database Systems: The Complete Book", Prentice Hall, Inc., Ch. 15, Oct. 1, 2001, pp. 713-715.
Grange, Frank, "Challenges in Modeling Demand for Inventory Optimization of Slow-Moving Items," Proceedings of the 1998 Winter Simulation Conference, 1998, pp. 1211-1217.
Greenlight.com Teams up With Credit Online to Expand Online Financing Options, Published in PR Newswire Association LLC; New York; Aug. 28, 2000 extracted from Dialog on Jun. 14, 2021, pp. 3.
Haffar, Imad, "SPAM: A Computer Model for Management of Spare-Parts Inventories in Agricultural Machinery Dealerships", Computers and Electronics in Agriculture, vol. 12, Issue 4, Jun. 1995, pp. 323-332.
Handfield et al., "Managing Component Life Cycles in Dynamic Technological Environments", International Journal of Purchasing and Materials Management, Tempe, Spring 1994, vol. 30, No. 2, pp. 20-28.
Inderfurth et al., "Decision Support for Spare Parts Acquisition in Post Product Life Cycle", Central European Journal of Operations Research, 2008, vol. 16, pp. 17-42.
"Intelligence Insight Impact", Polk Automotive Manufacturers; http://usa.polk.com/Industries/AutoMfr/Analyze/MarketAnalysis/, Dec. 13, 2007, pp. 3.
International Search Report and Written Opinion in PCT Application No. PCT/US07/76152, dated Mar. 20, 2009.

Invoicedealers.com, http://web.archive.org/web/20040804044511/http://www.invoicedealers.com/, Aug. 4, 2004, pp. 2.
Ivillage.com, http://web.archive.org/web/20040729234947/http://www.ivillage.com/, Jul. 29, 2004, pp. 2.
"Japan's JAAI System Appraises Used Cars Over Internet", Asia Pulse, Mar. 3, 2000, p. 1.
Jaro, Matthew A., "Probabilistic Linkage of Large Public Health Data Files", Statistics in Medicine, 1995, vol. 14, pp. 491-498.
Käki, Anssi, "Forecasting in End-Of-Life Spare Parts Procurement", Master's Thesis, Helsinki University of Technology, System Analysis Laboratory, Jul. 27, 2007, pp. 84.
Kennedy et al., "An Overview of Recent Literature on Spare Parts Inventories", International Journal of Production Economics, 2002, vol. 76, pp. 201-215.
Kim et al., "Optimal Pricing, EOL (End of Life) Warranty, and Spare Parts Manufacturing Strategy Amid Product Transition", European Journal of Operation Research, 2008, vol. 188, pp. 723-745.
Koller, Mike, "Wireless Service Aids," InternetWeek, Jul. 9, 2001, p. 15.
Krupp, James A.G., "Forecasting for the Automotive Aftermarket", The Journal of Business Forecasting Methods & Systems, Winter 1993-1994, vol. 12, No. 4, ABI/Inform Global, pp. 8-12.
Lapide, Larry, "New Developments in Business Forecasting", The Journal of Business Forecasting, Spring 2002, pp. 12-14.
Lee, Ho Geun, "AUCNET: Electronic Intermediary for Used-Car Transactions", EM—Electronic Markets, Dec. 1997, vol. 7, No. 4, pp. 24-28.
Miller, Joe, "NADA Used-Car Prices Go Online", Automotive News, Jun. 14, 1999, p. 36.
Moore, John R., Jr. "Forecasting and Scheduling for Past-Model Replacement Parts", Management Science, Application Series, vol. 18, No. 4, Part 1, Dec. 1971, pp. B-200-B-213.
"NAAA—Recommended Vehicle Condition Grading Scale", Noted as early as 2007, pp. 3.
Packer, A. H., "Simulation and Adaptive Forecasting an Applied to Inventory Control", Operations Research, Jul. 1965, vol. 15, No. 4, pp. 660-679.
"Power Information Network: Power to Drive your Business", J.D. Power and Associates Power Information Network, http://www.powerinfonet.com/products/productDetail.asp?type=financialinstitutions, Dec. 13, 2007, pp. 2.
Peters, Peter-Paul, "A Spare Parts Configurator for the European Service Business" (Graduation Report), Honeywell, Industrial Service Logistic Center, Amsterdam, The Netherlands, Mar. 2000, pp. 80.
Porter, G. Zell, "An Economic Method for Evaluating Electronic Component Obsolescence Solutions", www.gidep.org/data/dmsms/library/zell.pdf, May 1998, pp. 1-9.
"Pricing Tool", vAuto Live Market View, http://www.vauto.com/vAuto_Solution/pricing.asp, Dec. 13, 2007, pp. 2.
Reinbach, Andrew, "MCIF Aids Banks in CRA Compliance", Bank Systems & Technology, Aug. 1995, vol. 32, No. 8, p. 27.
Roos, Gina, "Web-Based Service Helps OEMs Cure Parts Obsolescence Blues", Electronic Engineering Times, Oct. 8, 2001, p. 86.
Santarini, Michael, "Forecasts the Probable Obsolescence of Components—Module Predicts Parts Life", Electronic Engineering Times, Jan. 11, 1999, vol. 1, p. 48.
Sawyers, Arlena, "NADA to Offer Residual Guide", Automotive News, May 22, 2000, p. 1.
Shapiro et al., "Systems Competition and Aftermarkets: an Economic Analysis of Kodak", The Antitrust Bulletin, Spring 1994, pp. 135-162.
"Stoneage Corporation Announces Database of 250,000 Used Cars Posted to the Internet", PR Newswire, Feb. 24, 1998, p. 1.
Sullivan, Laurie, "Obsolete-Parts Program Thriving", EBN, Manhasset, NY, Jan. 21, 2002, Issue 1296, p. 26.
"The Most Reliable Cars 2006", https://www.forbes.com/2006/04/20/reliable-vehicles-japanese_cx_dl_0424feat%20html?sh=19b3172a48f3, Apr. 24, 2006, pp. 4.
"Urban Science Launches Second Generation Lead Scoring Solution", Urban Science, Detroit, MI, Mar. 1, 2007, http://www.urbanscience.com/newsevents/pr_20070222.html, pp. 3.

(56) References Cited

OTHER PUBLICATIONS

"WashingtonPost.com and Cars.com Launch Comprehensive Automotive Web Site For the Washington Area", PR Newswire, Oct. 22, 1998. pp. 2.
Watts, Craig, "Consumers Now Can Know What Loan Rate Offers to Expect Based on Their FICO Credit Score at MyFICO.com," San Rafael, CA, Mar. 6, 2002, pp. 2, http://www.myfico.com/PressRoom/PressReleases/2002_03_06.aspx.
Webster, Lee R., "Failure Rates & Life-Cycle Costs", Consulting-Specifying Engineer, Apr. 1998, vol. 23, No. 4, ABI/Inform Global, p. 42.
"Web Sites Let Automotive Consumers Arm Themselves with Price Information", Orange County Register, Nov. 14, 1997, pp. 3.
"Yahoo! Autos Provides Enhanced Road Map for Researching, Buying and Selling Cars Online", PR Newswire, Oct. 13, 1998, pp. 2.

\* cited by examiner

SYSTEM, METHOD, APPARATUS AND MEDIUM FOR SIMULTANEOUSLY GENERATING VEHICLE HISTORY REPORTS AND PREAPPROVED FINANCING OPTIONS

CROSS-REFERENCE TO RELATED APPLICATIONS

Any and all applications for which a foreign or domestic priority claim is identified in the Application Data Sheet as filed with the present application are hereby incorporated by reference under 37 CFR 1.57. This application is a continuation of U.S. patent application Ser. No. 16/792,107, filed Feb. 14, 2020, which is a continuation of U.S. patent application Ser. No. 14/975,470, filed Dec. 18, 2015, which claims the benefit of priority under 35 U.S.C. § 119(c) of U.S. provisional Application No. 62/093,973, filed Dec. 18, 2014, the disclosure of each of which is hereby incorporated by reference in its entirety for all purposes.

BACKGROUND

The decision of buying or leasing a specific vehicle involves not only fulfilling the consumer's desired list of attributes for the vehicle, but also the consumer's ability to finance the purchase or lease of the specific vehicle with such attributes. Furthermore, the list of attributes and the financing options are interdependent, since the consumer's list of desired attributes may be affected by the ability to pay for such attributes, and the financing options available to the consumer are dependent on the vehicle's attributes which would affect the vehicle's price. The computer systems (and other computing devices) available to consumers today provide the ability to browse vehicles' attributes. Other systems available provide the ability to determine financing options available to consumers, independent of knowledge or the specific vehicles the consumer may be interested in. Additionally, vehicle seller systems may track the browsing history of consumers to determine which vehicles the consumer is interested in. There is currently no interconnection between all of the vehicle seller systems, financing systems, and consumer systems. Therefore, vehicle sellers are not made aware of the qualifications of such interested consumers and thus sellers may waste resources in attempts to sell a vehicle which the consumer cannot afford. The process of locating and purchasing a vehicle, or for selling the vehicle, using such independent systems is also much more time consuming and less efficient for the consumer as well as the car dealers and the lenders involved. Accordingly, systems and processes for integrating vehicle history report requests with requests for consumer information, processing the requested information against financing determination factors to determine a consumer's prequalified financing options, correlating these determinations with the consumer's browsing activities, and communicating such determinations to the consumer and the vehicle seller are desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description," one will understand how the features of the various aspects of this invention provide advantages that include improved communications between access points and stations in a wireless network.

One aspect of this disclosure provides a vehicle history and prequalification system. The system comprises a computer system, having a processor and a memory, and a data storage module accessible by the computer system. The computer system is configured to provide an interface for operation by a user at a remote computing device and receive a request, via the interface, from the user regarding a vehicle history report of a vehicle, the request including at least one of a vehicle identification number (VIN) of the vehicle, a license plate of the vehicle, or other unique identifier of the vehicle. The computer system is also configured to prompt the user, via the interface, for an indication of user interest in a prequalification for a financing offer associated with the vehicle. The computer system is further configured to receive the indication of user interest in the prequalification, via the interface, the indication including personal information of the user. The data storage module is configured to retrieve data corresponding to the vehicle from at least one of a third party information database, an industry publication database, a safety ratings database, and a vehicle specification database. The data storage module is further configured to store the retrieved data according to the VIN, license plate, or other unique identifier for the vehicle. The data storage module is also configured to retrieve data corresponding to a determination regarding the prequalification for the financing offer. The data storage module is also further configured to store the retrieved data according to one or more unique identifiers for the user. The computer system is then further configured to convey, via the interface, the vehicle history report to the user, the vehicle history report generated based on the retrieved and stored data corresponding to the vehicle and convey, via the interface, the prequalification determination to the user.

Another aspect disclosed is a method, the method comprising providing an interface for operation by a user at a remote computing device and receiving a request, via the interface, from the user regarding a vehicle history report of a vehicle, the request including at least one of a vehicle identification number (VIN) of the vehicle, a license plate of the vehicle, or other unique identifier of the vehicle. The method also comprises prompting the user, via the interface, for an indication of user interest in a prequalification for a financing offer associated with the vehicle and receiving the indication of user interest in the prequalification, via the interface, the indication including personal information of the user. The method further comprises retrieving data corresponding to the vehicle from at least one of a third party information database, an industry publication database, a safety ratings database, and a vehicle specification database and storing the retrieved data according to the VIN, license plate, or other unique identifier for the vehicle. The method also further comprises retrieving data corresponding to a determination regarding the prequalification for the financing offer and storing the retrieved data according to one or more unique identifiers for the user. The method further also comprises conveying, via the interface, the vehicle history report to the user, the vehicle history report generated based on the retrieved and stored data corresponding to the vehicle and conveying, via the interface, the prequalification determination to the user.

Another aspect disclosed is an apparatus for vehicle history and prequalification determination. The apparatus comprises means for providing communication with a user at a remote computing device and means for receiving a request from the user regarding a vehicle history report of a vehicle, the request including at least one of a vehicle identification number (VIN) of the vehicle, a license plate of the vehicle, or other unique identifier of the vehicle. The apparatus further comprises means for prompting the user for an indication of user interest in a prequalification for a financing offer associated with the vehicle and means for receiving the indication of user interest in the prequalification the indication including personal information of the user. The apparatus also comprises means for retrieving data corresponding to the vehicle from at least one of a third party information database, an industry publication database, a safety ratings database, and a vehicle specification database and means for storing the retrieved data according to the VIN, license plate, or other unique identifier for the vehicle. The apparatus also further comprises means for retrieving data corresponding to a determination regarding the pre-qualification for the financing offer and means for storing the retrieved data according to one or more unique identifiers for the user. The apparatus further also comprises means for conveying the vehicle history report to the user, the vehicle history report generated based on the retrieved and stored data corresponding to the vehicle and means for conveying the prequalification determination to the user.

Another aspect disclosed is a computer program product comprising a computer readable medium comprising instructions that, when executed, cause an apparatus to perform a method. The method comprises providing an interface for operation by a user at a remote computing device and receiving a request, via the interface, from the user regarding a vehicle history report of a vehicle, the request including at least one of a vehicle identification number (VIN) of the vehicle, a license plate of the vehicle, or other unique identifier of the vehicle. The method also comprises prompting the user, via the interface, for an indication of user interest in a prequalification for a financing offer associated with the vehicle and receiving the indication of user interest in the prequalification, via the interface, the indication including personal information of the user. The method further comprises retrieving data corresponding to the vehicle from at least one of a third party information database, an industry publication database, a safety ratings database, and a vehicle specification database and storing the retrieved data according to the VIN, license plate, or other unique identifier for the vehicle. The method also further comprises retrieving data corresponding to a determination regarding the prequalification for the financing offer and storing the retrieved data according to one or more unique identifiers for the user. The method further also comprises conveying, via the interface, the vehicle history report to the user, the vehicle history report generated based on the retrieved and stored data corresponding to the vehicle and conveying, via the interface, the prequalification determination to the user.

BRIEF DESCRIPTION OF THE DRAWINGS

The above-mentioned aspects, as well as other features, aspects, and advantages of the present technology will now be described in connection with various aspects, with reference to the accompanying drawings. The illustrated aspects, however, are merely examples and are not intended to be limiting. Throughout the drawings, similar symbols typically identify similar components, unless context dictates otherwise. Note that the relative dimensions of the following figures may not be drawn to scale.

DETAILED DESCRIPTION

Various aspects of the novel systems, apparatuses, and methods are described more fully hereinafter with reference to the accompanying drawings. The teachings disclosed may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different consumer goods and services industries. The detailed description and drawings are merely illustrative of the disclosure rather than limiting, the scope of the disclosure being defined by the appended claims and equivalents thereof.

Popular network technologies may include various types of wireless or wired networks. The wireless or wired network may be used to interconnect nearby devices together, employing widely used networking protocols. The various aspects described herein may apply to any communication standard, such as a wireless 802.11 protocol.

Figure 1:
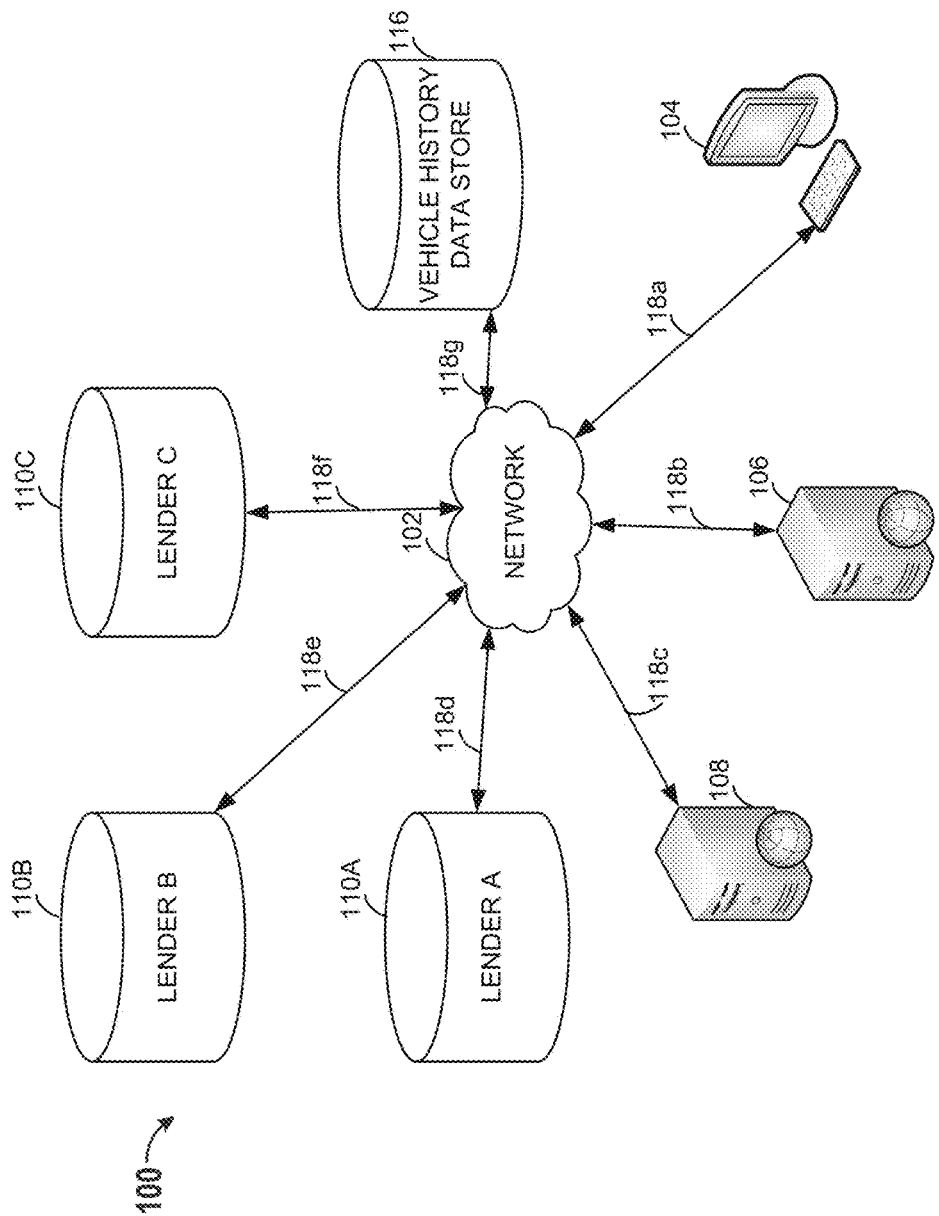
FIG. 1 illustrates one possible organization of a communication system for simultaneously generating vehicle history reports and preapproved financing options.

FIG. 1 illustrates one possible organization of a communication system 100 comprising a network 102, a consumer terminal 104, a vehicle history and prequalification server (VHPS) 106, a dealer server 108, a plurality of lender servers 110A-110C, and a vehicle history data store 116. Additionally, communication links 118a-118g are shown enabling communication among the components of communication system 100 via the network 102. In some embodiments, one or more of the servers and terminals described above may be combined into a single server and/or terminal combination device. The communication system 100 may be used to implement systems and methods described herein.

In some embodiments, a consumer may use the consumer terminal 104 to shop for a vehicle that the consumer intends to purchase. For example, the consumer terminal 104 may comprise a laptop, a desktop, a tablet, a mobile phone, a PDA, or any other computing device with which the consumer may browse the Internet. In some embodiments, the consumer may be shopping for another good besides a vehicle, for example furniture, a home, a marine vehicle, or similar goods which may involve financing. For simplicity, a consumer shopping activity described herein will be directed to a vehicle purchase or lease as an example, though other similar purchase activities as those described above are contemplated. When shopping for a vehicle, the consumer may be browsing a vehicle dealer's website. In some embodiments, the dealer website may be hosted by the dealer server 108. While shopping, the consumer may filter various listings on the dealer website to view only vehicles that meet various criteria as established by the consumer. While browsing the dealer's website, the consumer may select one or more vehicles that interest the consumer and may request a vehicle history report (VHR), or other additional information associated with the selected one or more vehicles. The request for the vehicle history report may initiate a communication from the dealer server 108 that is hosting the dealer website to the VHPS 106, though the VHR request may be handled in various other manners.

The VHPS 106 may comprise a server that provides one or more of VHRs and financing prequalification determinations. For example, the VHPS 106 may be able to provide the VHR for a vehicle given its vehicle identification number (VIN) or other unique identifying information, such as a license plate, etc. Additionally, or alternatively, the VHPS 106 may provide financing prequalification determinations for potential financing offers based on information from or about the consumer, information regarding the vehicle in which the consumer is interested, and qualification criteria as received from financial institutions and underwriters providing the financial offers. In some embodiments, the VHRs and the prequalification determinations may be provided by two distinct servers (not shown in this figure).

In providing the VHRs, the VHPS 106 may retrieve the VHRs from the vehicle history data store 116. The vehicle history data store 116 may comprise a database or other storage device comprising VHRs organized in a searchable manner. The vehicle history data store 116 may include one or more internal and/or external data sources. The data sources may include internal and external data sources which store, for example, vehicle history attributes data and/or other consumer data. In some embodiments, the vehicle history data store 116 may comprise a plurality of databases or sources, including third party databases or sources, such as an industry publication database, a safety ratings database, and a vehicle specification database, that include information regarding a vehicle history. In some embodiments, one or more of the databases or data sources may be implemented using a relational database, such as Sybase, Oracle, CodeBase and Microsoft® SQL Server as well as other types of databases such as, for example, a flat file database, an entity-relationship database, and object-oriented database, and/or a record-based database.

In some embodiments, the vehicle history data store 116 may comprise searchable data that will eventually be rendered to generate the VHRs. The VHRS can be used to aggregate information about a specific vehicle. In some embodiments, the vehicle history reports may include information regarding accident history, mileage history, ownership history, among others, for a designated vehicle (identified by the VIN or other unique identifying information).

Accordingly, in some embodiments, the VHPS 106 (or similar device) may request and extract appropriate data for the selected vehicle based on the provided VIN or other unique identifying information. In some embodiments, the extracted data or the vehicle history report may be provided to the requesting consumer in the form of the vehicle history report. For example, when the VHPS 106 receives a complete vehicle history report from another source, that vehicle history report may be communicated to the consumer, as requested. In some embodiments, the VHPS 106 may verify one or more pieces of information on the received complete vehicle history report to confirm the vehicle history report is accurate. In some embodiments, the VHPS 106 may generate the vehicle history report from extracted data received from one or more vehicle history data stores 116.

Additionally, or alternatively, the extracted data or the vehicle history report, or portions thereof, may be used in the prequalification determination. For example, when the VHPS 106 performs the prequalification determination, the VHPS 106 may analyze information regarding the specific vehicle, consumer information, and the qualification information provided by financial parties to determine if the consumer can be prequalified for a financing offer in relation to the specific vehicle. In some embodiments, the information regarding the specific vehicle may include price, make, model, year, body style, mileage, etc. In some embodiments, the consumer information may include name, birthdate, income, credit history, etc. The VHPS 106 may be configured to request and receive data from various databases based on the information needed to make the prequalification determination. For example, when the consumer requests the vehicle history report as described above, the consumer may be presented with one or more financing offers. If the consumer selects a financing offer of interest, the consumer may be prompted to enter information used in the financing prequalification (e.g., income, debt, credit score, biographical information, etc.). In some embodiments, the consumer may not be prompted to select a financing offer of interest, but rather the VHPS 106 may determine the consumer's prequalification status for all available financing offers in view of the provided vehicle and consumer information.

In determining prequalification for potential financing offers, the VHPS 106 may retrieve the qualification criteria directly from financing institutions (e.g., lenders' servers 110A-110C). In some embodiments, more than one financing institution may provide qualification criteria for financing offers, and the VHPS 106 may determine whether the consumer is prequalified. The VHPS 106 may determine the consumer's prequalification status based on the information provided by the consumer and the criteria provided by the financing institutions. For example, in some embodiments, a financing offer may comprise criteria requiring that the consumer have a credit score above 650 and an annual income of greater than $40,000. Accordingly, if the consumer can meet these criteria (e.g., has an income greater than $40,000 and a credit score of at least 650), then the VHPS 106 may determine that the consumer is qualified for that financing offer. In some embodiments, the VHPS 106 may be configured to provide the consumer information and/or the specific vehicle information to one or more of the lenders' servers 110A-110C.

In some embodiments, as shown in FIG. 1, the three lenders' servers (Lender A 110A, Lender B 110B, and Lender C 110C) may be part of the communication system 100 and may be configured to provide financing offers to consumer terminals 104 or prequalification criteria to the VHPS 106. When the lenders' servers 110A-110C are configured to perform the prequalification determinations, the lenders' servers 110A-110C may be configured to receive the consumer information and/or specific vehicle information from the VHPS 106 and may use the received information in the prequalification determinations. In some embodiments, prequalification results from the lenders' servers 110A-110C and/or the VHPS 106 may be provided to the consumer terminal 104 via the dealer website and the dealer server 108. In some embodiments, the prequalification results from the lenders' servers 110A-110C and/or the VHPS 106 may be communicated to the dealer. In some embodiments, the prequalification results from the lenders' servers 110A-110C and/or the VHPS 106 may be communicated to the consumer terminal 104 via e-mail or a private message. In some embodiments, the lenders' servers 110A-110C and/or the VHPS 106 may be configured to cause new window or popup to be displayed on the consumer terminal 104 so as to communicate directly with the consumer while bypassing the dealer website. In some embodiments, the VHPS 106 may receive the prequalification determination from the one or more lenders' servers 110A-110C and may communicate that information to one or more of the consumer (via the consumer terminal 104) or the dealer.

In some embodiments, the prequalification determination results from the lenders' servers 110A-110C and/or the VHPS 106 may be communicated to the dealer. In some embodiments, when the prequalification determination results are communicated to the dealer, they may be communicated along with a request to automatically filter the dealer listings to display only cars that the consumer is qualified to purchase using financing. For example, when the lenders' servers 110A-110C or the VHPS 106 determine that the consumer is not prequalified to purchase the specific vehicle selected by the consumer, they may idea what vehicle specifics would be acceptable (e.g., lower price, different make/model, fewer features, etc.). Accordingly, the "acceptable" vehicle specifics may be communicated to the dealer with a request to filter the dealer listings to show the consumer vehicles they are prequalified to purchase.

Figure 2:
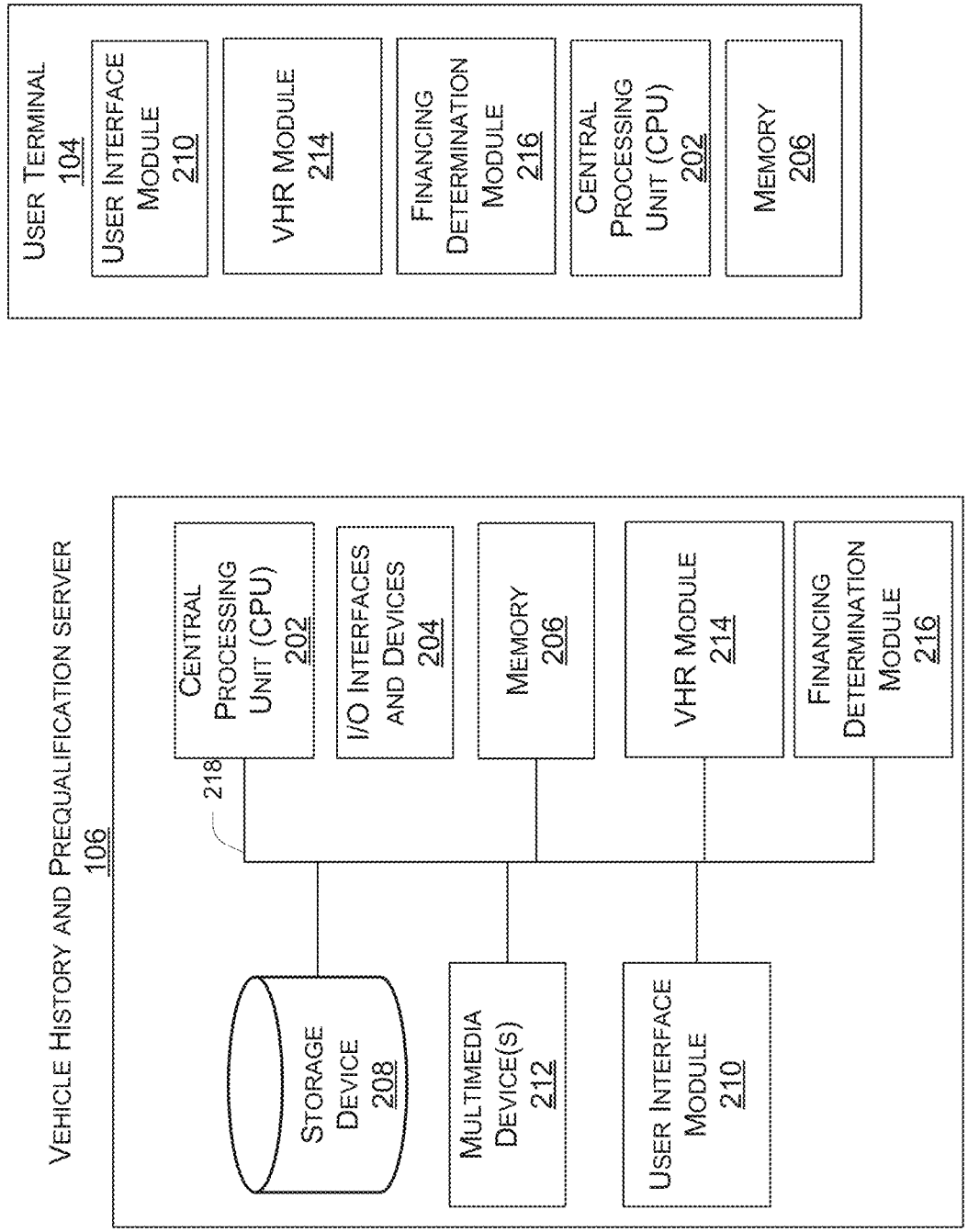
FIG. 2 is a block diagram corresponding to an aspect of hardware and/or software components of an example embodiment of the vehicle history and prequalification server of FIG. 1.

FIG. 2 is a block diagram corresponding to hardware and/or software components of an example embodiment of the VHPS of FIG. 1. The hardware and/or software components as discussed below with reference to the block diagram of the VHPS 106 may be included in any of the devices of the communication system 100 (e.g., the consumer terminal 104, the dealer server 108, and the lenders' servers 110A-110C). These components may be used to implement systems and methods described herein.

In some embodiments, certain modules described below, such as a user interface module 210, a vehicle history report (VHR) module 214, or a financing module 216 included with the VHPS 106 may be included with or performed by different and/or multiple devices of the communication system 100. For example, certain user interface functionality described herein may be performed by the user interface module 210 of the VHPS 106 and/or by the user interface module 210 of the consumer terminal 104.

In an embodiment, various software modules are included in the vehicle history reporting and financing system 100, which may be stored on a component of the system 100 itself, or on computer readable storage media separate from the system 100 and in communication with the system 100 via the network 102 or other appropriate means.

The VHPS 106 may include, for example, a computer that is IBM, Macintosh, or Linux/Unix compatible or a server or workstation. In some embodiments, the VHPS 106 comprises a smart phone, a personal digital assistant, a kiosk, or a media player. In some embodiments, the VHPS 106 includes one or more central processing units ("CPUs") 202, I/O interfaces and devices 204, memory 206, mass storage device 208, the user interface module 210, multimedia device 212, the VHR module 214, the financing module 216, and bus 218.

The CPU 202 may control operation of the VHPS 106. The CPU 202 may also be referred to as a processor. The CPU 202 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The I/O interface 204 may comprise a keypad, a microphone, a touchpad, a speaker, a touchscreen, and/or a display, or any other commonly available input/output (I/O) devices and interfaces. The I/O interface 204 may include any element or component that conveys information to a consumer of the VHPS 106 and/or receives input from the consumer. In one embodiment, the I/O interface 204 includes one or more display devices, such as a monitor, that allows the visual presentation of data to the consumer. More particularly, the display device may provide for the presentation of GUIs, application software data, and multimedia presentations, for example.

In some embodiments, the I/O interface 204 may provide a communication interface to various external devices. For example, the VHPS 106 may be electronically coupled to the network 102 (FIG. 1), which comprises one or more of a LAN, WAN, and/or the Internet. Accordingly, the I/O interface 204 may include an interface allowing for communication with the network 102, for example, via a wired communication port, a wireless communication port, or combination thereof. The network 102 may allow various terminals and computing devices and/or other electronic devices to communicate with each other via wired or wireless communication links.

The memory 206, which may include both read-only memory (ROM) and random access memory (RAM), may provide instructions and data to the CPU 202. For example, inputs received by one or more components of the device 202 may be stored in the memory 206. A portion of the memory 206 may also include non-volatile random access memory (NVRAM). The CPU 202 typically performs logical and arithmetic operations based on program instructions stored within the memory 206. The instructions in the memory 206 may be executable to implement the methods described herein.

The VHPS 106 may also include the mass storage device 208 for storing software or information (for example, the vehicle history reports or associated data). Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein. Accordingly, the VHPS 106 may include, e.g., hardware, firmware, and software, or any combination therein. The mass storage device 208 may comprise a hard drive, diskette, solid state drive, or optical media storage device.

As shown in FIG. 2, the VHPS 106 includes the VHR module 214. In some embodiments, the VHR module 214 may be stored in the mass storage device 208 as executable software code that is executed by the CPU 202. This, and other modules in the VHPS 106, may include components, such as hardware and/or software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 2, the VHPS 106 may be configured to execute the VHR module 214 to perform the various methods and/or processes as described herein.

In some embodiments, the VHR module 214 may be configured to identify a request for a vehicle history report as received from the consumer using the consumer terminal 104 of FIG. 1. In some embodiments, the request for the vehicle history report may include a VIN (or other unique identifier for a vehicle in which the consumer is interested) and a consumer identifier that identifies the consumer requesting the vehicle history report.

In some embodiments, the VHR module 214 may use the VIN to generate a request to a vehicle history data store (e.g., the external vehicle history data store 116 of FIG. 1). The request may be that all data and/or records associated with the VIN be returned to the VHR module 214. In some embodiments, when the data received from the vehicle history data store 116 is not compiled into a report that is easily understood by the consumer, the VHR module 214 may generate the vehicle history report for the ease of use by the consumer. The VHR module 214 may then communicate the vehicle history report to the consumer that requested the vehicle history report using the consumer identifier. Accordingly, the VHR module 214 may ensure that the consumer receives the requested vehicle history report regardless of the format of the data which the VHR module 214 receives from the vehicle history data store 116. For example, the VHR module 214 performs the verification of information on the received complete vehicle history report described above. Alternatively, or in addition, the VHR module 214 may generate the vehicle history report in a consumer friendly format from extracted data received from one or more vehicle history data stores 116. In some embodiments, the VHR module 214 may generate the vehicle history report only including information specifically requested by the consumer (e.g., number of owners, mileage issues, accidents, recalls, etc.). In some embodiments, the VHR module 214 may also be configured to provide vehicle information to one or more of the other components of the VHPS 106 and/or other components the system 100.

As shown in FIG. 2, the VHPS 106 includes the financing determination module 216. In some embodiments, the financing determination module 216 may be stored in the mass storage device 208 as executable software code that is executed by the CPU 202. This, and other modules in the VHPS 106, may include components, such as hardware and/or software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 2, the VHPS 106 is configured to execute the financing determination module 216 to perform the various methods and/or processes as described herein.

In some embodiments, the financing determination module 216 may be configured to identify a request, as received from the consumer using the consumer terminal 104 of FIG. 1, for a prequalification determination of the consumer with regard to one or more financing offers. The prequalification determination request may request affirmation or denial of whether or not the consumer is prequalified for one or more selected financing offers. For example, when purchasing a vehicle, the consumer may need or desire to apply for financing to pay for the vehicle. To determine if the consumer qualifies for a financing offer as presented by one or more lenders, the consumer may request a prequalification determination for each of the one or more financing offers. The prequalification determination for a financing offer may be a less detailed determination than an application process for the same financing offer. In some embodiments, the prequalification determination may utilize both consumer information (e.g., financial information, etc.) as well as vehicle information (e.g., make, model, price, etc.). In some embodiments, the prequalification determination may utilize only consumer information.

Accordingly, in some embodiments, the request for the prequalification determination may include vehicle information as well as information about the consumer (e.g., personal information, financial information, etc.) and the consumer identifier that identifies the consumer requesting the prequalification determination. In some embodiments, the consumer information may be saved as part of a consumer profile, for example, as associated with a consumer account with the dealer or the lenders. Accordingly, when the consumer information is part of the consumer profile, the prequalification determination request may not include receiving the personal information from the consumer, but rather from the dealer server 106 or the consumer terminal 104 or the lender server 110A-110C. In some embodiments, the consumer information may be linked with a third party account. For example, when prompted for consumer information, the consumer may provide login credentials for a third party account (e.g., a bank account, a store account, etc.), and the third party account may be used a source for the desired consumer information. For example, when prompted for consumer financial information, the consumer may provide their bank account credentials, and the VHPS 106 (via one or more of the I/O interfaces and devices 204, the CPU 202, the user interface module 210, and the financing determination module 216) may request and receive the consumer financial information from the bank account.

In some embodiments, the financing determination module 216 may receive the prequalification determination request from the consumer and communicate the request to one or more of the lenders' servers 110A-110C for the lenders themselves to determine via a financing determination process. The financing determination process may comprise a process of applying the consumer information and/or the vehicle information to the financing criteria established by the lenders. Accordingly, the financing determination module 216 may receive a communication from the lenders' server 110A-110C regarding the determination (e.g., qualified or not qualified) and may communicate that determination to the dealer and/or the consumer via the I/O interfaces and devices 204 and/or the user interface module 210 and the user identifier.

In some embodiments, the financing determination module 216 may receive the prequalification criteria from the lenders' servers 110A-110C. The financing determination module 216 may be configured to apply the information received in the prequalification determination request to the prequalification criteria received from the lenders' servers 110A-110C to generate the requested prequalification determination. Accordingly, the financing determination module 216 may perform the financing determination process. As described above, when the lenders perform the financing determination process to determine the result of the prequalification determination request, the result may be communicated back to the financing determination module 216 (e.g., via the I/O interfaces and devices 204), which may communicate the result to the consumer using the consumer identifier. This result may also be communicated to the dealer in conjunction with the consumer identifier to allow the dealer to better customize their sales efforts based on the consumer prequalification results. When the financing determination module 216 determines the result of the prequalification determination request itself, the financing determination module 216 may communicate the result to the consumer using the consumer identifier. Similarly, the result may be communicated to the dealer to allow for customized sales efforts based on that consumer's qualifications.

In some embodiments, the result of the prequalification determination request may be a simple "Yes" or "Prequalified" or "Approved" or "No" or "Denied", among others. In some embodiments, if the result of the prequalification determination request is negative, the financing determination module 216 may use the provided consumer information and specific vehicle information (when applicable) to generate attributes or factors that may lead to a prequalification determination for the consumer. For example, if the specific vehicle selected by the consumer is too expensive in view of the financial information provided by the consumer, then the financing determination module 216 may generate an attribute or factor indicating the price of the specific vehicle was too high. Alternatively, or additionally, if the specific vehicle selected involves too much risk in view of the criteria, the financing determination module 216 may generate vehicle features (e.g., the vehicle has too many miles or is of an undesirable make/model or includes a title issues) associated with these risks.

In some embodiments, the financing determination module 216 may then generate a communication to the dealer (e.g., via the I/O interfaces and devices 204) requesting the dealer provide a listing of vehicles that meet the generated list of attributes or factors. This requested listing may comprise a list of vehicles available at the dealer for which the consumer would be prequalified to purchase. The financing determination module 216 may then cause the listing of vehicles that meet the generated list of attributes or factors to be displayed or provided to the consumer, for example via the user interface module 210 or via the I/O interfaces and devices 204. In some embodiments, the financing determination module 216 may provide this listing of vehicles to the dealer in conjunction with the consumer identifier so the dealer may tailor its services and offerings to the consumer. Accordingly, even if the consumer is not approved for the requested financing offer (or any automatically searched financing offer), the financing determination module 216 may provide the consumer with options that would be available. Accordingly, the financing determination module 216 may ensure that the consumer receives the requested prequalification determination regardless of where the determination is made and may be provided with purchase options regardless of the prequalification determination.

The VHPS 106 also includes the user interface module 210. In some embodiments, the user interface module 210 may also be stored in the mass storage device 208 as executable software code that is executed by the CPU 202. In the embodiment shown in FIG. 2, the VHPS 106 may be configured to execute the user interface module 210 to perform the various methods and/or processes as described herein.

The user interface module 210 may be configured to generate, provide, and/or operate user interfaces of various types. In some embodiments, the user interface module 210 constructs pages or displays to be displayed in a web browser or computer/mobile application. In some embodiments, the user interface module 210 may provide an application or similar module for download and operation on the consumer terminal 104, through which the consumer and the VHPS 106 may interact. The pages may, in some embodiments, be specific to a type of device, such as a mobile device or a desktop web browser, to maximize usability for the particular device.

For example, the user interface module 210 may be configured to automatically detect a type of computing device that is requesting vehicle history information or prequalification determinations, such as a mobile phone, a desktop computer, etc. This detection may be made via an identifier that is communicated with the request. In some embodiments, the detection may be based on a consumer selection when the consumer interacts with the VHPS 106 for the first time. According to the detection, the user interface module 210 may determine to send information formatted optimized for the proper computing device being used by the consumer.

In some embodiments, the user interface module 210 may also interact with a client-side application, such as a mobile phone application (an "app"), a standalone desktop application, or user communication accounts (e.g., e-mail, SMS messaging, etc.) and provide data as necessary to display vehicle history and prequalification determinations. When interacting with the client-side application that is provided by the VHPS 106 (e.g., a VHPS 106 specific application or similar application), the user interface module 210 may be configured to format data for communication according to specifications and standards associated with that application. For example, the user interface module 210 may be configured to format all communication messages according to specific information elements that may be understood by the application on the computing device. Accordingly, information may be securely and efficiently communicated back and forth when both sides know the appropriate specifications and standards.

In some embodiments, one or more windows or interactions between the VHPS 106 and the consumer may involve a lightbox or overlay layer or a popup or window. For example, a lightbox or overlay may comprise a format that displays images and/or videos and text or prompts by filling the screen, and dimming out the rest of the web page or display. The lightbox or overlay may, alternatively, or additionally, places a new set of images, information, or prompts over existing data while maintaining the existing data though it is covered (and thus not viewable) while the new set of information is visible. Use of the lightbox or overlay may allow for the presentation of new information to the consumer without causing the consumer to lose the existing information. Additionally, or alternatively, the lightbox or overlay allows the consumer to view at least a portion of the existing information simultaneously with the information in the lightbox or overlay. Additionally, or alternatively, the popup or window may allow for the resizable display of information or requests to the user while allowing for simultaneous viewing and access to new and existing information. The VHPS 106 may also include one or more multimedia devices 140, such as speakers, video cards, graphics accelerators, and microphones, for example.

The various components of the VHPS 106 may be coupled together by a bus system 218. The bus system 218 may include a data bus, for example, as well as a power bus, a control signal bus, and a status signal bus in addition to the data bus. In different embodiments, the bus could be implemented in Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of VHPS 106 may be combined into fewer components and modules or further separated into additional components and modules than that shown in FIG. 2.

The VHPS 106 may be controlled by operating system software, such as Windows XP, Windows Vista, Windows 7, Windows 8, Windows Server, Unix, Linux, SunOS, Solaris, IOS, Android, Blackberry OS, or other similar operating systems. In Macintosh systems, the operating system may be any available operating system, such as MAC OS X. In other embodiments, the VHPS 106 may be controlled by a proprietary operating system. Conventional operating systems control and schedule computer processes for execution, perform memory management, provide file system, networking, I/O services, and provide a user interface, such as a graphical user interface ("GUI"), among other things.

Figure 3:
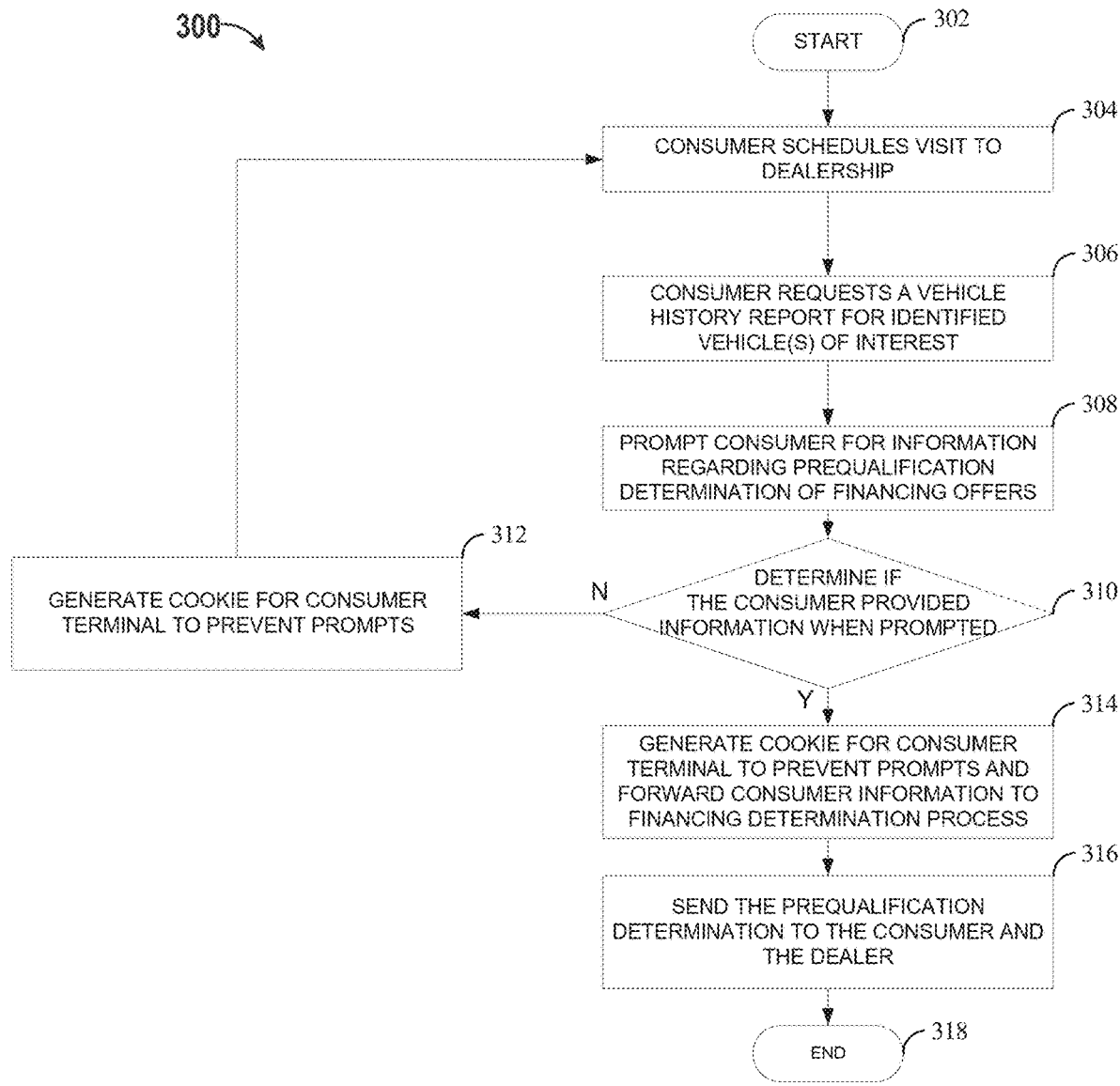
FIG. 3 is a process flowchart illustrating an example method of generating a vehicle history report and a prequalification determination based on the consumer request.

FIG. 3 is a process flowchart illustrating an example method of generating a vehicle history report and a prequalification determination based on the consumer request. Process 300 is an exemplary description of a method that may involve the consumer and the VHPS 106. Methods similar to process 300 may be run simultaneously, in an overlapping manner, or sequentially for multiple consumers at multiple locations that are each accessing the VHPS 106 via one or more dealer websites and/or servers. In some embodiments, particular steps of the process 300 may be implemented by the CPU 202, as referenced in FIG. 2. In some embodiments, one or more of the steps of the process 300 may be implemented by one or more of the components of the VHPS 106, as referenced in FIGS. 1 and 2.

Process 300 begins at block 302 and progresses to block 304. At block 304, the consumer visits a vehicle shopping portal or website, for example the vehicle website discussed above. The visit to the vehicle shopping portal may include browsing or searching for a vehicle of interest by the consumer. Once the consumer identifies a vehicle of interest, the process 300 proceeds to block 306.

At block 306, the consumer requests a vehicle history report (VHR) for the identified vehicle of interest. In some embodiments, the consumer may request multiple VHRs when there are multiple identified vehicles of interest. In some embodiments, requesting the VHR may comprise selecting or identifying a specified link or VHR request button, as will be described in further detail below. In some embodiments, the VHR request link or button may be on a vehicle listing's specific page or may be an option when viewing a group of listing as applied to multiple specific listings. Once the consumer requests the VHR, the process 300 proceeds to block 308.

At block 308, the consumer is presented with a prompt to input information regarding a prequalification determination for one or more available financing offers. In some embodiments, the prompt may be presented to the consumer based on the consumer requesting the VHR for the vehicle of interest. In some embodiments, the prompt may be presented to the consumer based on the consumer selecting a link or button regarding prequalification determinations. In some embodiments, the prompt may request the consumer provide information regarding the type of financing offer the consumer desires. In some embodiments, the prompt may appear as part of an overlay, lightbox, or popup. In some embodiments, the prompt may include individual fields for entry by the consumer for each item of information needed for the prequalification determination. In some embodiments, the prompt may include login credentials for various accounts that may already include the consumer information needed for the prequalification determination. For example, the fields may include a login credentials request for a bank account, a store website or a credit vendor. Once the prompt has been provided to the consumer, the process 300 proceeds to block 310.

At block 310, the process 300 determines if the consumer provided consumer information when prompted at block 308. If the consumer did provide the requested consumer information when prompted, the process 300 proceeds to block 314. If the consumer did not provide the requested consumer information when prompted, the process 300 proceeds to block 312.

At block 312, the process 300 may interpret the consumer's failure to provide consumer information when requested as a lack of interest in a financing prequalification determination and may place a temporary cookie on the consumer terminal to prevent future prompts requesting consumer information for the vehicle of interest. By making this interpretation and placement of the cookie, the process 300 may streamline the consumer's shopping experience by refraining from prompting the consumer for consumer information simply because the consumer requests the associated vehicle history report.

In some embodiments, the process 300 at block 312 will again prompt the consumer, this time asking the consumer if they would like to block future consumer information prompts. If the consumer indicates that they do want to block future prompts, then the process 300 may set the cookie preventing future consumer information prompts. If the consumer indicates that they do not want to block future consumer information prompts, then the process 300 may not set the cookie preventing future consumer information prompts. By this second prompt, the process 300 may avoid improperly interpreting the consumer's failure to provide consumer information as a lack of interest. In some embodiments, the cookie may expire after a predetermined amount of time. In some embodiments, the consumer may manually request to reactivate the consumer information prompts if desired. Once the process 300 determines whether or not to set the cookie at block 312, the process 300 proceeds to block 302 and restarts.

At block 314, the process 300 may acknowledge the receipt of the consumer's information when requested and may place a temporary cookie on the consumer terminal to prevent future prompts requesting consumer information for the vehicle of interest. The process 300 may assume that future prompts requesting the consumer information may not be needed for each vehicle of interest because the consumer information may remain constant regardless of the vehicle. Accordingly, the consumer information might only be received once and then stored for application in any and all financing offer prequalification determinations. In some embodiments, the consumer will be again prompted at block 314, this time the prompt requesting that the consumer confirm whether or not they would like to block future consumer information prompts. If the consumer indicates that they do want to block future consumer information prompts, then the process 300 might set the cookie preventing future consumer information prompts. If the consumer indicates that they do not want to block future consumer information prompts, then the process 300 might not set the cookie preventing future consumer information prompts. In some embodiments, the cookie might expire after a predetermined amount of time. In some embodiments, the consumer may manually trigger or adjust the cookie.

Once the process 300 determines whether or not to set the cookie at block 314, the process 300 forwards the information from the consumer to the financing determination process (described above in relation to FIG. 2). In some embodiments, the financing determination process is performed by the VHPS 106 (for example, the financing determination module 216 described in relation to FIG. 2). In some embodiments, the financing determination process may be performed by an external device or system (for example, the lenders' servers 110A-110C). Once the consumer information is provided to the entity that will perform the prequalification determination (e.g., the financing determination module 216 or the lenders' servers 110A-110C), the process 300 proceeds to block 316.

After the cookie is set in either blocks 312 or 314, consumer information prompts may be blocked based on the previously set cookie as the consumer continues to visit the vehicle shopping website. In some embodiments, the cookie may block prompts for only the previously viewed vehicles, so that repeated views of the same vehicle will not generate multiple, useless prompts. In some embodiments, the cookie may block prompts for all vehicles for the predetermined amount of time. In some embodiments, the cookie may be replaced by any other flag, indicator, value, or process that may be used to control whether or not the prompts are displayed subsequently.

At block 316, the process 300 proceeds to send the prequalification determination to the consumer and the dealer. In some embodiments, the prequalification determination may be presented to the consumer and/or the dealer as a lightbox, overlay, or popup. In some embodiments, the prequalification determination may include multiple options of financing offers available and allow or request the consumer to select one or more of the multiple options. In some embodiments, the prequalification determination may be negative for the selected vehicle and may provide alternate options for the consumer to review for which the consumer may be approved. In some embodiments, the prequalification determination may be negative with no alternatives. Once the prequalification determination is provide to the consumer and the dealer, the process 300 ends at block 318.

In some embodiments, the consumer may not be prompted for information regarding the prequalification determination until the VHR requested by the consumer is displayed to the consumer. For example, the lightbox, overlay, or popup including the prequalification questions may display over the VHR. In some embodiments, the prompt for information regarding the prequalification determination may occur as soon as the VHR is requested and while the VHR is being retrieved and/or generated.

Figure 4:
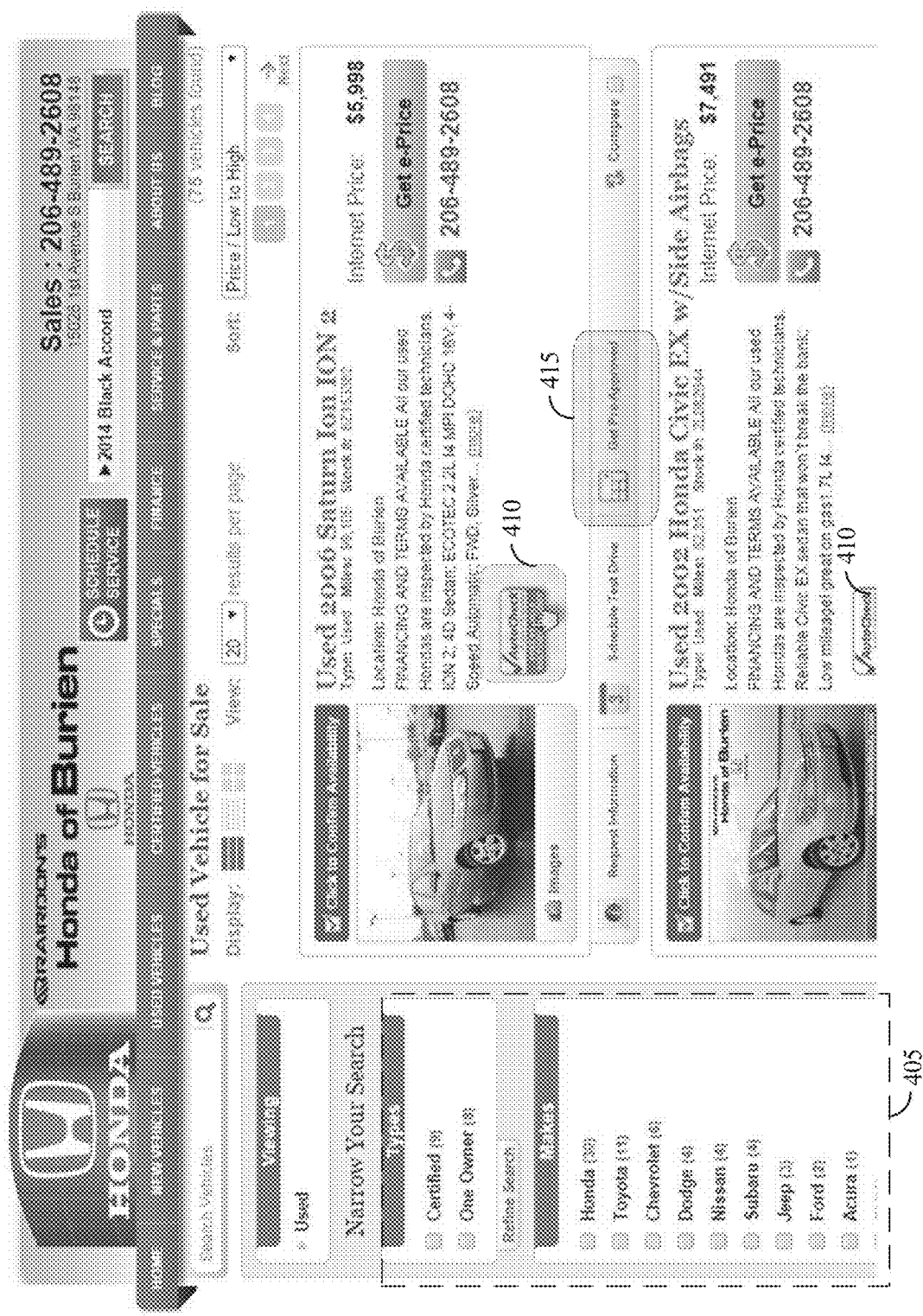
FIG. 4 is an example consumer interface for prompting the consumer for information needed to perform the prequalification determination, as used in an embodiment.

FIG. 4 is an example consumer interface generated by the VHPS 106 for browsing or searching for a vehicle of interest by the consumer. FIG. 4 shows a listing of vehicles that may be browsed or searched by the consumer. As shown, the left side of the FIG. 4 screen shows a plurality of filters 405 which the consumer may choose to apply to their search or browsing session to limit or control what vehicles are displayed. Associated with the vehicle listings are vehicle history report triggers 410. The triggers may comprise soft buttons, radio buttons or dials, or any other selection indicator, including text links, picture links, touchscreen detection, switch, etc. Each vehicle listing may have its own vehicle report trigger 410. The vehicle report trigger 410 may send a request for a VHR for the identified vehicle, when activated by the consumer. This request may correspond to the request received by process 300 at block 304. Additionally, or alternatively, each vehicle listing may have its own Pre-Approval trigger 415. The Pre-Approval trigger 415 may send a request from the consumer indicating that the consumer is interested in obtaining a preapproval determination for a financing offer. However, as noted above, activation of the vehicle report trigger 410 may automatically activate the request for preapproval and prequalification, as discussed above in relation to process 300 of FIG. 3.

Figure 5:
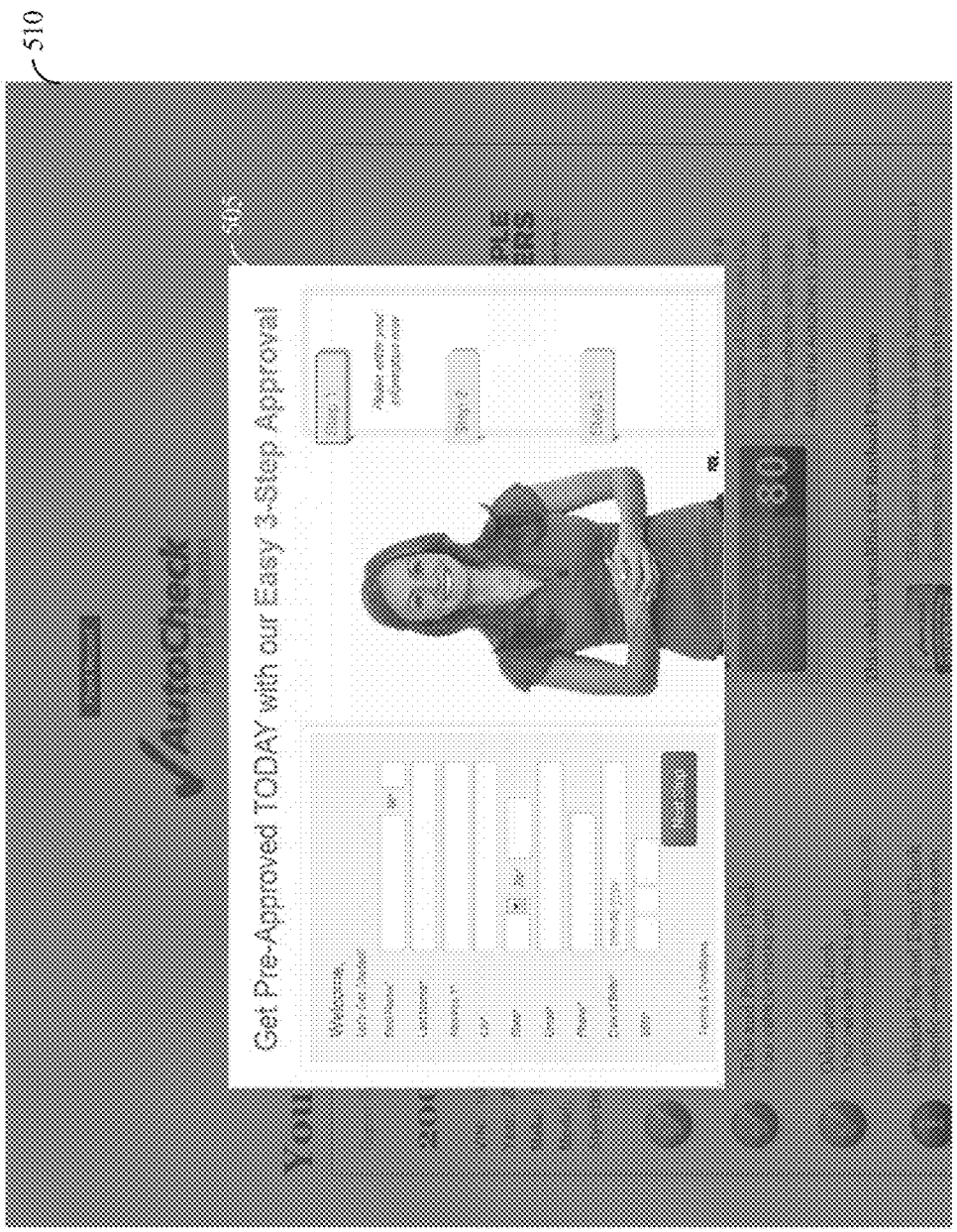
FIG. 5 is an example consumer interface for prompting the consumer for information needed to perform the prequalification determination, as used in an embodiment.

FIG. 5 is an example consumer interface for prompting the consumer for information needed to perform the prequalification determination, as used in an embodiment. FIG. 5 shows a prompt for preapproval or prequalification that appears as a lightbox or overlay 505 on top of an existing VHR 510. In some embodiments, the lightbox 505 may be on top of the vehicle listing of FIG. 4 and may appear as soon as the consumer selects the vehicle report button 410. As shown in FIG. 5, the prompt may include various fields requesting personal information of the consumer, including name, address, contact information, date of birth, and social security number. In some embodiments, more or less information may be requested as part of the prompt. As indicated, the lightbox may be displayed for multiple steps of information prompts (three as indicated in FIG. 5). However, this need not always be the case.

Figure 6:
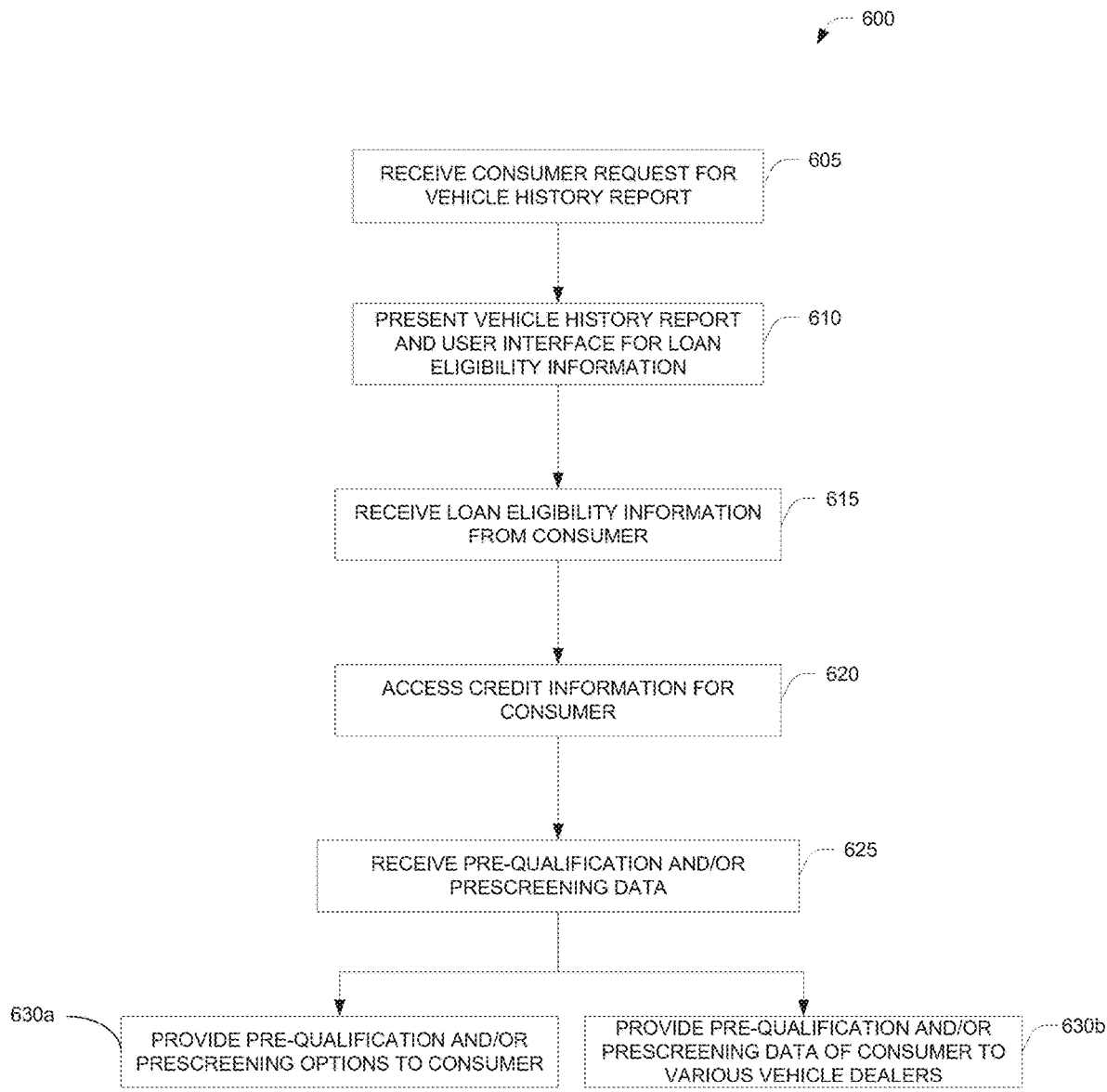
FIG. 6 is a flowchart illustrating a process for providing a consumer with a vehicle's history report and also providing the pre-qualification and/or pre-approval determinations, as used in an embodiment.

FIG. 6 is a flowchart illustrating a process 600 for providing a consumer with a vehicle's history report and also providing the pre-qualification and/or pre-approval determinations. The process 600 may be executed, for example, by the user interface modules 210 and/or the vehicle history reporting module 214 and/or the financing determination module 216 of the VHPS 106, and/or the user interface module 210 and/or the financing determination module 216 of the consumer terminal 104. In various embodiments, fewer blocks or additional blocks may be included in the process 600, or various blocks may be performed in an order different from that shown in FIG. 6.

Beginning at block 605, the VHPS 106 receives a consumer request for a vehicle history report for a specific vehicle while the consumer is browsing vehicles at a dealer. For example, the request may be received from the consumer via an application executing on the consumer terminal 104 (FIG. 1), which may be a consumer device. Based on the request, the application may access one or more of a variety of different internet sites, including for example, car dealership websites, used vehicle shopping websites, vehicle history websites, and the like. The application may access one or more of these internet sites to acquire information to generate the requested vehicle history report or to acquire the already generated vehicle history report. In some embodiments, the application may access these sites to confirm acquired information. Once the necessary information is acquired form these internet sites, the process 600 proceeds to generate or compile the vehicle history report if a previously generated vehicle history report is not available.

At block 610, the VHPS 100 presents the generated or acquired vehicle's history report to the consumer. In addition, either automatically or in response to a consumer request, the VHPS 106 presents to the consumer a user interface, such as, for example a fillable form, or the like, to receive loan eligibility information from the consumer, including, for example, the consumer's name, address, email address, phone number, date of birth, social security number, and the like. An example of the form is shown in FIG. 5 above. In some embodiments, the fillable form of the user interface may comprise an option for the consumer to provide login credentials for another account, for example, a bank account, credit account, or another third party credential or information verification source, etc., where the loan eligibility information may already be provided and/or stored. In some embodiments, the loan eligibility information corresponds to the consumer information described above.

Continuing at block 615, the VHPS 106 receives the information from the consumer using the user interface presented. In some embodiments, if the consumer refuses to fill out the information, a temporary cookie may be placed on the consumer terminal 104 of the consumer to prevent the presentation of the user interface until expiration of the temporary cookie. In other embodiments, other such preventive measures may be used, or the consumer may be asked for the information after a predetermined time period. The consumer may also be prompted to make a selection of specific lenders to contact. Additionally, or alternatively, at block 615, the process 600 may be configured to use the received login credentials to access the indicated account to acquire the necessary loan eligibility information.

Next at block 620, the VHPS 106 provides the information to one or more lenders to determine eligibility for the consumer. In some embodiments, the VHPS 106 uses the information to access a data storage storing credit information for consumers, in parallel with and/or instead of submitting the eligibility requests to the one or more lenders. The accessed data storage may provide credit information for the consumer that may be used, in conjunction with financing criteria received from the one or more lenders, to determine eligibility for the consumer (e.g., via the financing determination module 216 of FIG. 2). Accordingly, either the VHPS 106 or the one or more lenders uses the loan eligibility information to determine if the consumer is pre-qualified for a financing offer. In some embodiments, the determination includes specific vehicle information.

At block 625, the VHPS 106 receives (or accesses) lending decisions based on the information received from the consumer. For example, the lending decisions may come from the one or more lenders described above in block 620. In some embodiments, the lending decisions may be made pursuant to a process similar to the financing determination process described above. For example, when the pre-qualification decision is made by the lenders, the VHPS 106 may receive the decision from the lenders via the network 102 of the system 100 of FIG. 1.

At block 630*a*, the VHPS 106 provides the pre-qualification and/or pre-screening data to the consumer interested in the specific vehicle. The data presented to the consumer may include loan offers for which the consumer is pre-screened and pre-qualified. In some embodiments, the consumer may also be prompted to provide consent for receiving a pre-qualification report. In some embodiments, the consumer may also be presented with information that the consumer does not qualify for any loan offers, or that the vehicle in which the consumer is interested does not qualify for any loan offers. If the vehicle does not qualify for any loan offers, the VHPS 106 may provide a list of vehicles, available at the dealer, that would qualify for loan offers.

For each loan offer, various information about the particular loan offer may be presented to the consumer, including for example who is the lender, what the loan offer includes (for example, an annual percentage rate (APR) and a term/duration for the loan), any conditions which may need to be satisfied prior to the loan being approved or distributed, and an associated action the consumer may take now with respect to the loan offer. The associated action presented may depend on the type of loan offer—for example, the consumer may have the option to "Lock-in Rate" or "Apply Now!" If the consumer selects to move forward with the loan offer, the consumer may be directed to the lender's website or may be requested to provide additional information needed to proceed with applying for the loan offer.

At block 630*b*, instead of, or in addition to block 630*a*, the VHPS 106 provides the pre-qualification and/or pre-screening data of consumers interested in specific vehicles to a seller of the specific vehicle—such as for example the dealer. The dealer may then use this information to present additional vehicle options to the consumer. In some embodiments, the dealer may receive information only indicating that the consumer did or did not qualify for a loan offer. For example, if the dealer receives indication that the consumer does not qualify for a loan offer for a specific vehicle, the dealer may redirect the consumer to another vehicle with similar attributes for which the consumer may qualify. On the other hand, if the dealer sees that the consumer did qualify for the loan offer, the dealer may more aggressively try to close the sale of that vehicle to the consumer.

Alternatively, or additionally, the dealer may be provided with detailed information as to why the consumer did or did not qualify when the information relates to the vehicle, which the dealer may use try to sell a different vehicle to better suit the needs of both the dealer and the consumer. In some embodiments, in order to maintain confidentiality, the determination may not be provided to the dealer in any circumstances. In some embodiments, when additional vehicle options are presented to the consumer, they may be presented via the same user interface. The additional vehicle options may be determined based on the vehicle attributes selected by the consumer, as well as the financing amount for which the consumer is pre-screened and/or pre-qualified. The determination of additional vehicles satisfying the criteria may be completely automated.

Figure 7:
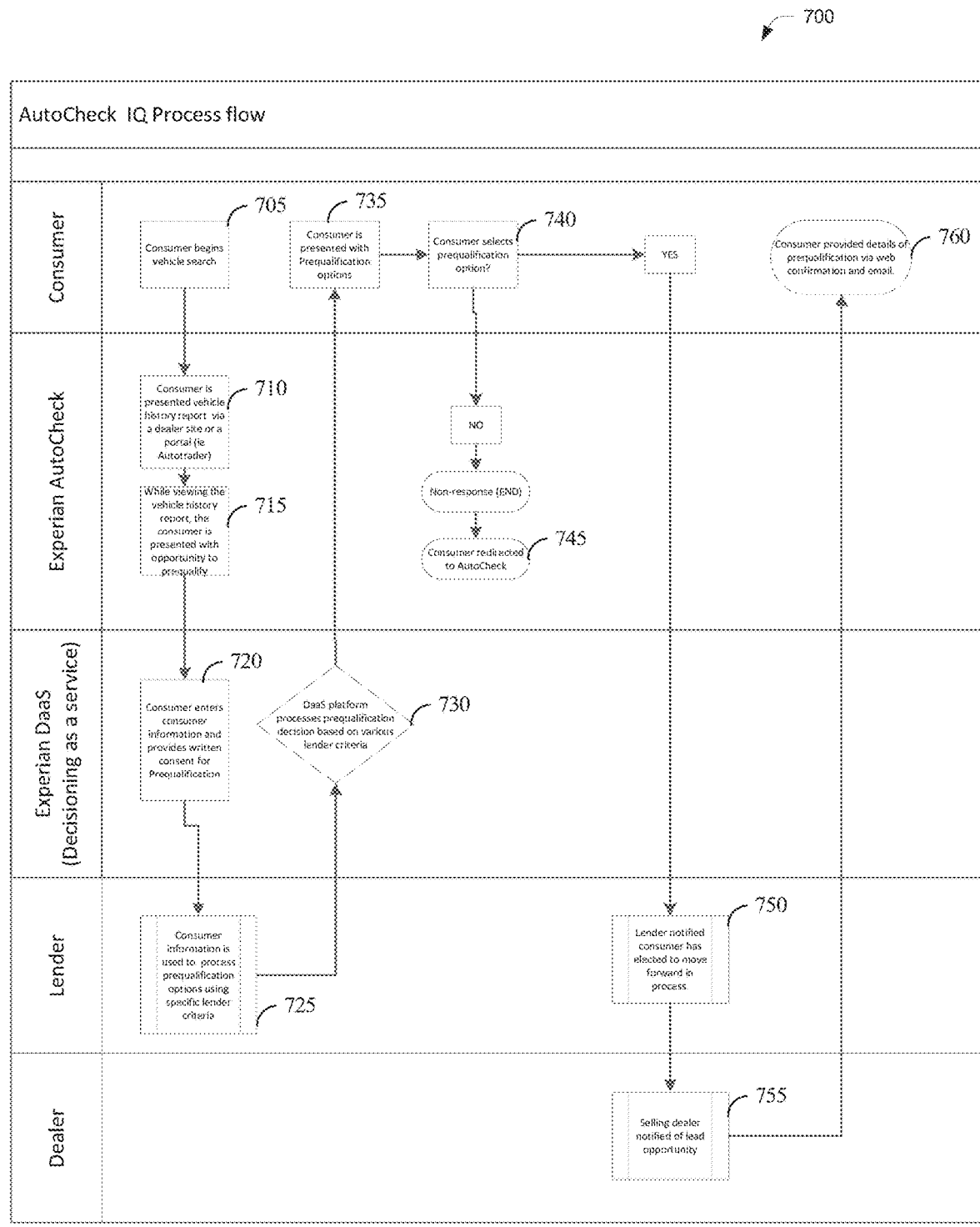
FIG. 7 is a flowchart illustrating another embodiment of a process for providing a consumer with a vehicle's history report and also providing the pre-qualification and/or pre-approval determinations.

FIG. 7 is a flowchart illustrating another embodiment of a process 700 for providing a consumer with a vehicle's history report and also providing the pre-qualification and/or pre-approval determinations. The process 700 includes steps of the process 600 which are identified by corresponding element numbers. To the extent that the activities in these corresponding blocks are the same as those described with reference to FIG. 6, they will not be repeated in detail here. The process 700 may be executed, for example, by the user interface modules 210 and/or the vehicle history reporting module 214 and/or the financing determination module 216 of the VHPS 106, and/or the user interface module 210 and/or the financing determination module 216 of the consumer terminal 104. In various embodiments, fewer blocks or additional blocks may be included in the process 700, or various blocks may be performed in an order different from that shown in FIG. 7.

Beginning at block 705, the consumer begins a vehicle search. In some embodiments, this vehicle search may begin on a dealer or a vehicle listing (e.g., portal) website. As part of the consumer's vehicle search, the consumer may identify a vehicle of interest and may request the vehicle history report for that vehicle. This request may be communicated to the dealer or portal website and communicated to the VHPS 106. The VHPS 106 receives the consumer request for the vehicle history report (similar to block 605 of process 600), and may present the consumer with the vehicle history report on the dealer or portal website at block 710 (similar to block 610 of process 600). While the vehicle history report is being viewed by the consumer, the consumer may be presented with an opportunity to prequalify for financing and provide consumer information needed for the prequalification process at block 715. At block 720, similar to block 620 of process 600, the consumer enters their consumer information and provides their consent for a prequalification decision.

Then, at block 725, a lender (or the VHPS 106 as described above) may use the consumer information to determine if the consumer qualifies for any financing options using specific lender criteria. At block 730, the process 700 may include a decisioning as a service (DaaS) platform to process the prequalification decision based on the various lender criteria. At block 735, the consumer is presented with the prequalification determination and options, similar to block 630a of process 600. Once the consumer is presented with the options, at block 740, the consumer may have the opportunity to pursue one of the financing options for which the consumer is prequalified. If the consumer decides not to select a prequalification option (or fails to provide a response), the process 700 proceeds to block 745, where the consumer is redirected to another website and the consumer's data and prequalification determinations are cleared.

If the consumer decides to select a prequalification option at block 740, the process proceeds to block 750, the process 700 may notify the lender that the consumer does want to pursue one of the financing offers and may redirect the consumer to the lender's website. Once the lender is notified of the consumer's interest, the process 700 proceeds to block 755, where the dealer is notified of the consumer's interest, as this may comprise a sales lead for the dealer. Then the process 700 proceeds to block 760, where the consumer is provided details of the prequalification via a web confirmation and/or an e-mail. In some embodiments, the presentation of information to the consumer may be via an overlay or lightbox interface as described above.

Terminals and computing devices, which may comprise the software and/or hardware described above, may be an end user computing device that comprises one or more processors able to execute programmatic instructions. Examples of such computing devices are a desktop computer workstation, a smart phone such as an Apple iPhone or an Android phone, a computer laptop, a tablet PC such as an iPad, Kindle, or Android tablet, a video game console, or any other device of a similar nature. In some embodiments, the computing devices may comprise a touch screen that allows a user to communicate input to the device using their finger(s) or a stylus on a display screen.

The computing devices may also comprise one or more client program applications, such as a mobile "app" (e.g. iPhone or Android app) that may be used to visualize data, and initiate the sending and receiving of messages in the VHPS 106. This app may be distributed (e.g. downloaded) over the network to the computing devices directly from the VHPS 106 (e.g., the user interface module 210 or the storage device 208) or from various third parties such as an Apple iTunes or Google Play repository or "app store." In some embodiments, the application may comprise a set of visual interfaces that may comprise templates to display vehicle history reporting and financing information. In some embodiments, as described above, visual user interfaces may be downloaded from another server or service, such as the VHPS 106. This may comprise downloading web page or other HTTP/HTTPS data from a web server and rendering it through the "app". In some embodiments, no special "app" need be downloaded and the entire interface may be transmitted from a remote Internet server to computing device, such as transmission from a web server that is a part of the VHPS 106 to an iPad, and rendered within the iPad's browser.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the vehicle history reporting and financing system 100, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

In some embodiments, the system distinguishes between the initial transmission of loan application data required for user interfaces, and subsequent transmissions of user interface data so that it may transmit only portions that are necessary to update a vehicle history reporting and financing user interface. This may be done, for example, using an XMLHttpRequest (XHR) mechanism, a data push interface, Asynchronous JavaScript and XML ("Ajax"), or other communication protocols.

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

The various features and processes described above may be used independently of one another, or may be combined in various ways. All possible combinations and sub combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could." "might," or "may." unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by the vehicle history reporting and financing system 100, consumer terminal 104, and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Other embodiments relating to the systems and methods disclosed herein are detailed in the following documents, found in the Appendix of the present application, the entirety of which is bodily incorporated herein and the entirety of which is also incorporated herein by reference.

What is claimed is:

1. A system comprising:
   a communication interface configured to:
      electronically communicate with a network comprising one or more of a wired or wireless network; and
      receive or access, via the network, one or more financial criteria, wherein one or more corresponding financial institutions make determinations regarding a prequalification status of one or more users based at least in part on the one or more financial criteria;
   a data store comprising one or more databases, wherein at least one of the one or more databases is configured to store the one or more financial criteria; and
   a server comprising one or more processors programmed to execute instructions that cause at least one processor of the one or more processors to:
      receive or access, from a user of the one or more users via the network, a request;
      generate and transmit, to a remote computing device associated with the user, display instructions that are configured to, once executed, display one or more user interface elements for operation by the user and to include, in the display, an electronic vehicle history report for a selected vehicle in an active viewing session;
      during the active viewing session, automatically performing a suppression analysis based on prior user behavior data, the prior user behavior data including a negative indication response to a prompt or no response to the prompt within a set time;
      in response to a determination of no suppression based on the suppression analysis, automatically provide instructions for generating a prompt to the user, via the one or more user interface elements, for a selection indicating interest in a financing offer and for personal information of the user to determine prequalification for a financing offer, wherein the prompt is generated as an overlay layer via the one or more user interface elements and wherein the overlay layer is placed over previous data displayed via the one or more user interface elements at the remote computing device, making at least a portion of the previous data not viewable by the user while the prompt is visible, receive or access, from the user via the one or more user interface elements, a response request that includes one or more of: an electronic request for information regarding the selected vehicle associated with a dealer that is selling the selected vehicle, an indication of interest in a financing offer, and the personal information of the user;

retrieve or access, from the data store, at least one financial criteria; and determine that the user meets the at least one financial criteria based at least on a portion of the personal information of the user or a price of the selected vehicle.

2. The system of claim 1, wherein, based on a negative determination that the user does not meet the at least one financial criteria as to the selected vehicle, the instructions further cause the at least one processor to:

generate at least one factor that would allow the user to meet the at least one financial criteria;

access a list of vehicles available at the dealer that would meet the at least one financial criteria;

convey, via the one or more user interface elements, the negative determination that the user does not meet the at least one financial criteria and the at least one factor to the user; and convey, via the one or more user interface elements, the list of vehicles available at the dealer that would meet the at least one financial criteria.

3. The system of claim 2, wherein the at least one factor comprises at least one of price information, vehicle history information, or vehicle attribute information.

4. The system of claim 2, wherein the instructions further cause the at least one processor to cause the one or more user interface elements to display the list of vehicles available at the dealer that would meet the at least one financial criteria for viewing by the user.

5. The system of claim 2, wherein the instructions further cause the at least one processor to:

analyze the personal information of the user to determine prequalification; and identify at least one financing offer for which the user is prequalified for based at least in part on the analyzing of the personal information of the user.

6. The system of claim 2, wherein the communication interface is further configured to receive the one or more financial criteria from systems of the one or more financial institutions.

7. The system of claim 2, wherein the server is further configured to convey, via the communication interface, the negative determination to a dealer system associated with the dealer and causing the dealer system to provide the list of vehicles available at the dealer that would meet the at least one financial criteria.

8. The system of claim 2, where the server is further configured to:

convey, via the one or more user interface elements, details of a financing offer, for which the user is prequalified and which is associated with a selected vehicle of the list of vehicles available at the dealer that would meet the at least one financial criteria, to the user;

prompt the user, via the one or more user interface elements, for an indication of user interest in pursuing the financing offer for which the user is prequalified;

receive, via the one or more user interface elements, the indication of user interest in pursuing the financing offer; and convey, via the communication interface, the indication of the user interest in pursuing the financing offer to a system of a corresponding financial institution of the one or more financial institutions.

9. The system of claim 2, wherein the list of vehicles available at the dealer meets the at least one factor and wherein the list of vehicles available at the dealer does not include the selected vehicle.

10. A computer-implemented method comprising:

receiving or accessing, via a network comprising one or more of a wired or wireless network, an electronic request from a user of one or more users;

receiving or accessing, via the network, one or more financial criteria, wherein one or more corresponding financial institutions make determinations regarding a prequalification status of one or more users based at least in part on the one or more financial criteria;

accessing a data store comprising one or more databases, wherein a first database of the one or more databases is configured to store the one or more financial criteria;

generate and transmit, to a remote computing device associated with the user, display instructions that are configured to, once executed, display one or more user interface elements for operation by the user and to include, in the display, an electronic vehicle history report for a selected vehicle in an active viewing session;

during the active viewing session, automatically performing a suppression analysis based on prior user behavior data, the prior user behavior data including a negative indication response to a prompt or no response to the prompt within a set time;

in response to a determination of no suppression based on the suppression analysis, automatically provide instructions for generating a prompt to the user, via the one or more user interface elements, for a selection indicating interest in a financing offer and for personal information of the user to determine prequalification for a financing offer, wherein the prompt is generated as an overlay layer via the one or more user interface elements and wherein the overlay layer is placed over previous data displayed via the one or more user interface elements at the remote computing device, making at least a portion of the previous data not viewable by the user while the prompt is visible;

receiving or accessing, from the user via the one or more user interface elements, a response request that includes one or more of: an electronic request for information regarding the selected vehicle associated with a dealer that is selling the selected vehicle, an indication of interest in a financing offer, and the personal information of the user;

retrieving or accessing, from the first database, at least one financial criteria; and determining that the user meets the at least one financial criteria based at least on a portion of the personal information of the user or a price of the selected vehicle.

11. The computer-implemented method of claim 10, further comprising:
based on a negative determination that the user does not meet the at least one financial criteria as to the selected vehicle;
generating at least one factor that would allow the user to meet the at least one financial criteria;
accessing a list of vehicles available at the dealer that would meet the at least one financial criteria;
conveying, via the one or more user interface elements, the negative determination that the user does not meet the at least one financial criteria and the at least one factor to the user; and
conveying, via the one or more user interface elements, the list of vehicles available at the dealer that would meet the at least one financial criteria.

12. The computer-implemented method of claim 11, wherein the at least one factor comprises at least one of price information, vehicle history information, or vehicle attribute information.

13. The computer-implemented method of claim 11, further comprising generating instructions for displaying, via the one or more user interface elements, the list of vehicles available at the dealer that would meet the at least one financial criteria for viewing by the user.

14. The computer-implemented method of claim 11, further comprising:
analyzing the personal information of the user to determine prequalification; and
identifying at least one financing offer for which the user is prequalified for based at least in part on the analyzing of the personal information of the user.

15. The computer-implemented method of claim 11, further comprising receiving the one or more financial criteria from systems of the one or more financial institutions.

16. The computer-implemented method of claim 11, further comprising conveying, via the one or more user interface elements, the negative determination to a dealer system associated with the dealer and causing the dealer system to provide the list of vehicles available at the dealer that would meet the at least one financial criteria.

17. The computer-implemented method of claim 11, further comprising:
conveying, via the one or more user interface elements, details of a financing offer, for which the user is prequalified and which is associated with a selected vehicle of the list of vehicles available at the dealer that would meet the at least one financial criteria, to the user;
prompting the user, via the one or more user interface elements, for an indication of user interest in pursuing the financing offer for which the user is prequalified;
receiving, via the one or more user interface elements, the indication of user interest in pursuing the financing offer; and
conveying the indication of the user interest in pursuing the financing offer to a system of a corresponding financial institution of the one or more financial institutions.

18. The computer-implemented method of claim 11, wherein the list of vehicles available at the dealer meets the at least one factor and wherein the list of vehicles available at the dealer does not include the selected vehicle.

19. A computer program product comprising a non-transitory computer readable medium comprising instructions that, when executed, cause an apparatus to perform a method, the method comprising: receiving or accessing, via a network comprising one or more of a wired or wireless network, an electronic request from a user of one or more users;
receiving or accessing, via the network, one or more financial criteria, wherein one or more corresponding financial institutions make determinations regarding a prequalification status of one or more users based at least in part on the one or more financial criteria;
accessing a data store comprising one or more databases, wherein a first database of the one or more databases is configured to store the one or more financial criteria;
generate and transmit, to a remote computing device associated with the user, display instructions that are configure to, once executed, display one or more user interface elements for operation by the user and to include, in the display, an electronic vehicle history report for a selected vehicle in an active viewing session;
during the active viewing session, automatically performing a suppression analysis based on prior user behavior data, the prior user behavior data including a negative indication response to a prompt or no response to the prompt within a set time;
in response to a determination of no suppression based on the suppression analysis, automatically provide instructions for generating a prompt to the user, via the one or more user interface elements, for a selection indicating interest in a financing offer and for personal information of the user to determine prequalification for a financing offer, wherein the prompt is generated as an overlay layer via the one or more user interface elements and wherein the overlay layer is placed over previous data displayed via the one or more user interface elements at the remote computing device, making at least a portion of the previous data not viewable by the user while the prompt is visible;
receiving or accessing, from the user via the one or more user interface elements, a response request that includes one or more of: an electronic request for information regarding the selected vehicle associated with a dealer that is selling the selected vehicle, an indication of interest in a financing offer, and the personal information of the user;
retrieving or accessing, from the first database, at least one financial criteria; and
determining that the user meets the at least one financial criteria based at least on a portion of the personal information of the user or a price of the selected vehicle.

20. The computer program product of claim 19 further comprising instructions that, when executed, cause the apparatus to further perform:
based on a negative determination that the user does not meet the at least one financial criteria as to the selected vehicle;
generating at least one factor that would allow the user to meet the at least one financial criteria;
accessing a list of vehicles available at the dealer that would meet the at least one financial criteria;
conveying via the one or more user interface elements, the negative determination that the user does not meet the at least one financial criteria and the at least one factor to the user; and conveying via the one or more user interface elements, the list of vehicles available at the dealer that would meet the at least one financial criteria.

* * * * *